(12) United States Patent
Kremer et al.

(10) Patent No.: US 7,603,093 B2
(45) Date of Patent: Oct. 13, 2009

(54) SYSTEM AND METHOD TO MONITOR BROADBAND RADIO FREQUENCY TRANSPORT SYSTEMS

(75) Inventors: Michael Kremer, Shakopee, MN (US); William J. Mitchell, Eden Prairie, MN (US); Paul Schatz, Burnsville, MN (US); Jerry Toms, Shakopee, MN (US); Philip M. Wala, Waseca, MN (US); Bernard K. Wiwel, Bloomington, MN (US); Dean Zavadsky, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 484 days.

(21) Appl. No.: 11/302,723

(22) Filed: Dec. 14, 2005

(65) Prior Publication Data

US 2007/0135056 A1   Jun. 14, 2007

(51) Int. Cl.
*H04B 1/06* (2006.01)
*H04B 7/00* (2006.01)

(52) U.S. Cl. .................. 455/233.1; 455/227
(58) Field of Classification Search .............. 455/233.1, 455/227, 8, 17, 504, 506, 522, 526, 63.1, 455/68, 69, 701
See application file for complete search history.

(56) References Cited

U.S. PATENT DOCUMENTS

| 4,183,054 A | 1/1980 | Patisaul et al. |
| 4,611,323 A | 9/1986 | Hessenmiiller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |

(Continued)

FOREIGN PATENT DOCUMENTS

| EP | 0391597 | 10/1990 |
| EP | 1081882 | 3/2001 |
| WO | 9115927 | 10/1991 |
| WO | 9719531 | 5/1997 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

(Continued)

*Primary Examiner*—Edward Urban
*Assistant Examiner*—Christian A Hannon
(74) *Attorney, Agent, or Firm*—Fogg & Powers LLC

(57) ABSTRACT

A system to monitor gain in a broadband radio frequency transport system that includes a radio frequency antenna, a remote unit, and a host unit adapted to receive a signal from the remote unit over a transmission link. The remote unit includes a pilot tone generator adapted to generate at least one single-frequency tone having a known power level, a summing circuit operably associated with the pilot tone generator adapted to sum the single-frequency tone with the respective received radio frequency signal. Each host unit includes a pilot tone receiver circuit to receive the transmitted signal and detect the single-frequency tone transmitted over the transmission link. The host unit includes a controller to determine a gain within the transmission link and to determine if the gain is in a preset range of gains based on the power level of the received pilot tone.

28 Claims, 16 Drawing Sheets

U.S. PATENT DOCUMENTS

| | | | |
|---|---|---|---|
| 5,193,109 A | 3/1993 | Chien-Yeh Lee | |
| 5,243,598 A | 9/1993 | Lee | |
| 5,321,849 A | 6/1994 | Lemson | |
| 5,339,184 A | 8/1994 | Tang | |
| 5,680,395 A * | 10/1997 | Weaver et al. | 370/331 |
| 6,480,722 B1 | 11/2002 | Takada et al. | |
| 6,567,987 B1 * | 5/2003 | Farhan et al. | 725/125 |
| 6,829,471 B2 * | 12/2004 | White et al. | 455/194.2 |
| 7,006,483 B2 * | 2/2006 | Nelson et al. | 370/342 |
| 7,046,966 B2 * | 5/2006 | Davis | 455/69 |
| 2006/0019694 A1 * | 1/2006 | Sutivong et al. | 455/522 |

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", , pp. 1171-1175, Publisher: IEEE.

* cited by examiner

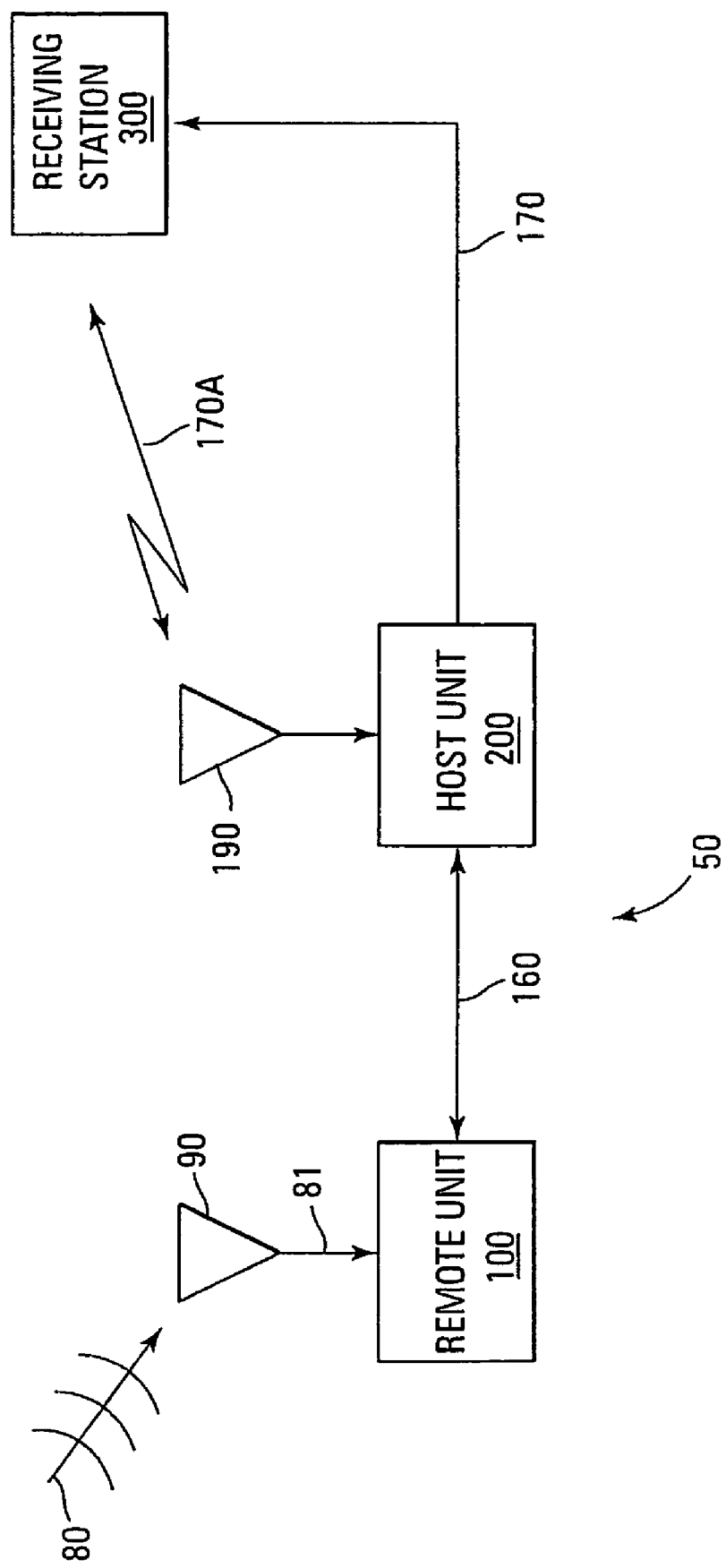

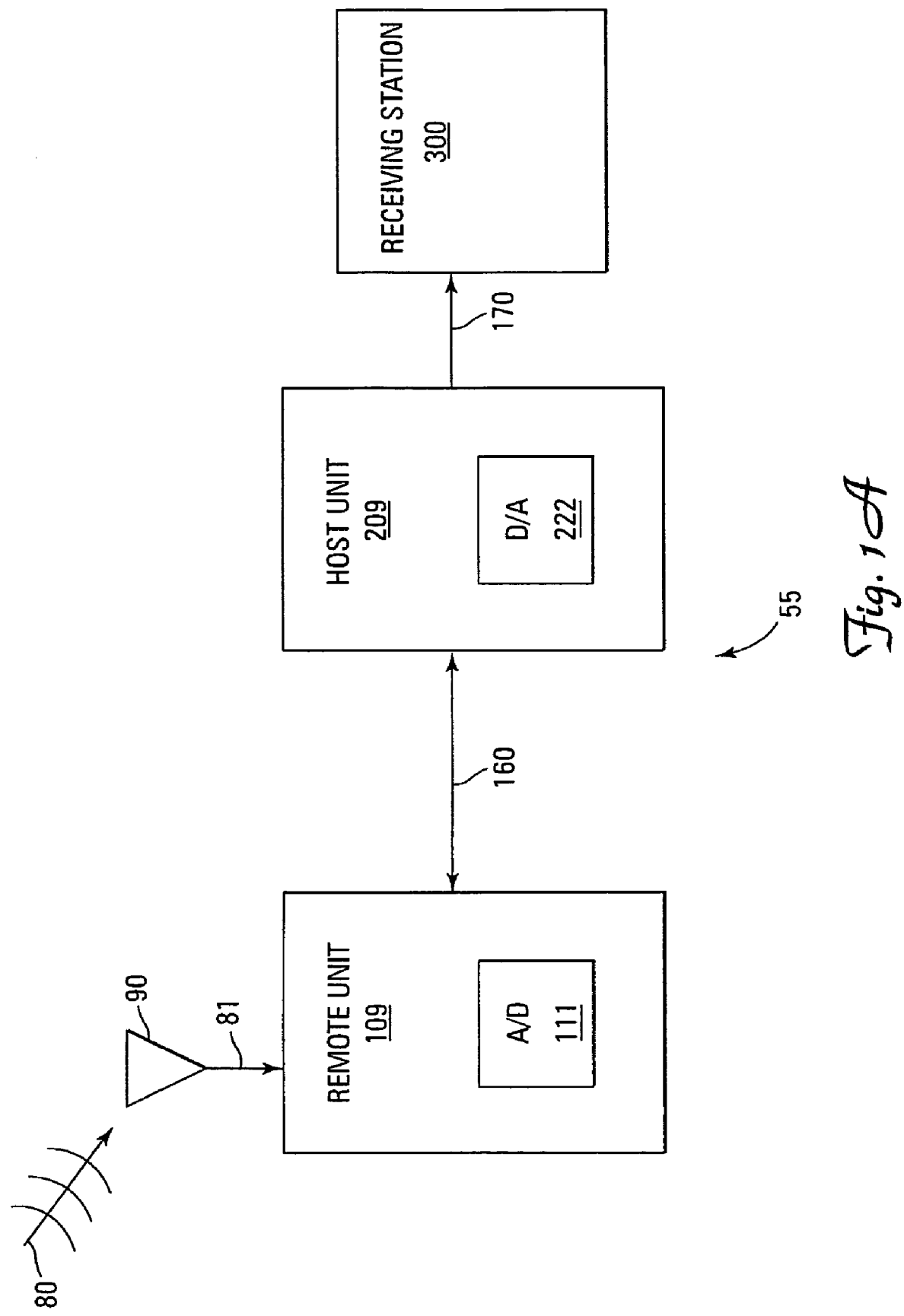

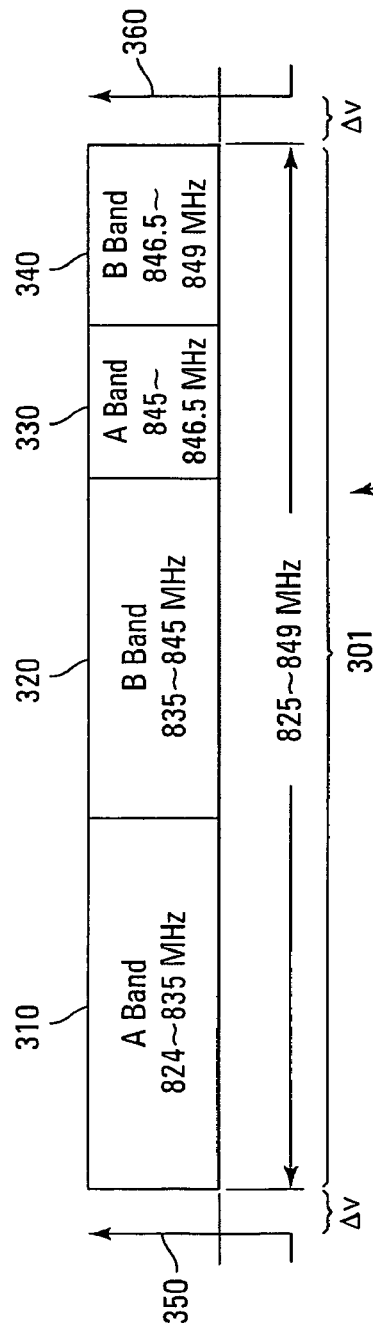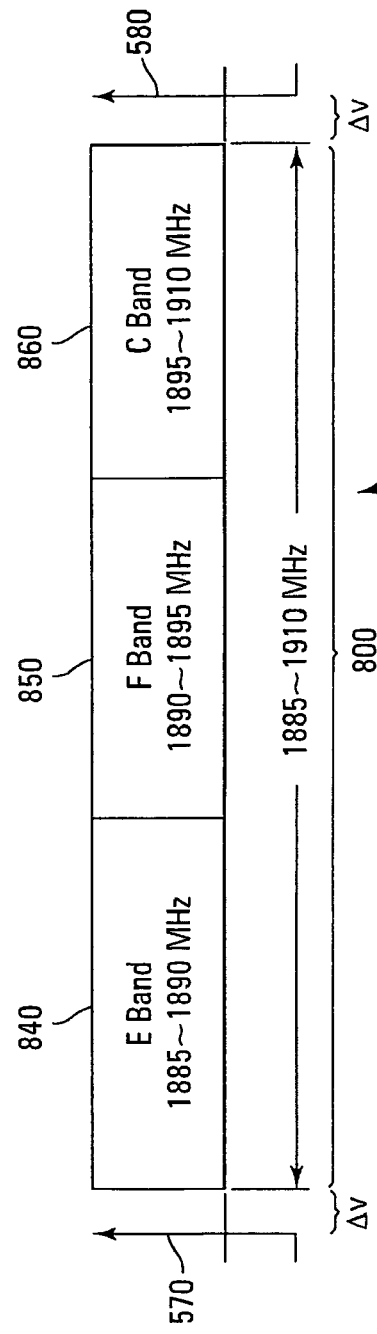

SYSTEM AND METHOD TO MONITOR BROADBAND RADIO FREQUENCY TRANSPORT SYSTEMS

BACKGROUND

In broadband transport systems that simultaneously broadcast signals from remote users to a receiving station, a plurality of reverse paths simultaneously transmit data to the receiving station. Each reverse path includes a transport link between a remote unit and a host unit. The section of the reverse path that includes the remote unit and the host unit amplifies the signal received at the remote unit. The host units are in communication with the receiving station. In some cases the host units are co-located with the receiving station. The transport link can be any type of communication medium such as an optical fiber, a coaxial cable or a free-space optical link.

The signals from a plurality of host units are summed and provided to the receiving station. If one of the transport links loses gain, the receiving station will not necessarily be able to determine there is a loss in one link, since the relative drop in power is within the noise level of the receiving station. If the receiving station does, however, detect a loss in gain in one or more of the transport links, the receiving station is not able to distinguish which of the many transport links is degraded. Thus, one or more of the remote units in communication with a receiving station can experience a degraded communication and the controllers at the receiving station will be unaware of the problem. This can lead to a poor performing transport system and customer dissatisfaction. Moreover, if the receiving station recognizes that signals received from the host unit are degraded or inadequately amplified, each reverse path is subjected to troubleshooting procedures to determine which path is degraded. This response is time consuming and expensive.

For the reasons stated above and for other reasons stated below which will become apparent to those skilled in the art upon reading and understanding the specification, there is a need in the art for monitoring gain in remote reverse link radio frequency stages in simulcast architectures.

SUMMARY

The embodiments of the present invention provide methods and systems for monitoring gain in remote reverse link radio frequency stages and will be understood by reading and studying the following specification.

One aspect of the present invention provides a system to monitor gain in a broadband radio frequency transport system that includes at least one radio frequency antenna that receives a radio frequency signal, at least one remote unit communicable with a respective one of the radio frequency antennae and at least one host unit adapted to receive a signal from over the transmission link from a respective one of the remote units. Each remote unit includes a pilot tone generator adapted to generate at least one single-frequency tone having a known power level, a summing circuit operably associated with the pilot tone generator adapted to sum the single-frequency tone with the respective received radio frequency signal, and at least one amplifier in communication with the summing circuit. The at least one amplifier amplifies the summed signal and transmits the signal over a respective transmission link. Each host unit includes a pilot tone receiver circuit adapted to receive the transmitted signal and detect the single-frequency tone transmitted over the transmission link from the received signal and a controller. The controller is adapted to determine a gain within the transmission link and to determine if the gain is in a preset range of gains based on the power level of the received pilot tone.

Another aspect of the present invention provides a method to monitor gain in a broadband transport system. The method includes receiving a broadband radio frequency signal, adding at least one single-frequency tone to the broadband signal to form a summed signal, transmitting the summed signal through a transmission link, receiving the transmitted summed signal, determining a gain in the single-frequency tone transmitted through the transmission link, and determining when the gain is an acceptable gain.

Yet another aspect of the present invention provides a system to monitor repeater links in a broadband transport system including means for summing a plurality of broadband radio frequency signals received at a respective plurality of remote antennae with at least one respective single-frequency signal at a respective plurality of remote units, means for amplifying the plurality of signals, means for transmitting the plurality of amplified signals to a respective host unit and means for determining a gain for each transmitted single-frequency signal at the respective host unit.

Yet another aspect of the present invention provides a system to monitor a broadband radio frequency transport system. The system includes at least one remote unit, each remote unit communicable with a respective radio frequency antenna. Each remote unit includes at least one amplifier in communication with the antenna and a double down-converter adapted to down-convert in frequency the in-band radio frequency signals. The at least one amplifier amplifies in-band radio frequency signals associated with a radio frequency signal received at the radio frequency antenna. The system also includes at least one host unit adapted to receive the signal transmitted over a transmission link from a respective one of the remote units. Each host unit includes a double up-converter circuit adapted to up-convert in frequency the in-band radio frequency signals, a noise floor detector circuit adapted to determine the power level of the noise outside the frequency of the in-band radio frequency signals and a controller adapted to determine if a noise level is within an acceptable noise level.

Yet another aspect of the present invention provides a method to monitor a broadband radio frequency transport system. The method includes receiving a broadband radio frequency signal, amplifying the broadband radio frequency signal, double down-converting the broadband signal and transmitting the double down-converted broadband signal through a transmission link.

Yet another aspect of the present invention provides a system to monitor gain in repeater links in a broadband transport system. The system includes means for double down-converting a plurality of signals received at remote antennae, means for amplifying the plurality of signals, and means for transmitting the plurality of amplified signals to a respective host unit.

Yet another aspect of the present invention provides a system to monitor gain in repeater links in a broadband transport system. The system includes means for direct down-converting a plurality of signals received at remote antennae, means for amplifying the plurality of signals, and means for transmitting the plurality of amplified signals to a respective host unit.

Yet another aspect of the present invention provides a remote unit communicable with a radio frequency antenna. The remote includes a pilot tone generator, a summing circuit, and at least one amplifier in communication with the summing circuit. The pilot tone generator is adapted to generate at least one single-frequency tone having a known power level. The summing circuit is operably associated with the pilot tone generator and is adapted to sum the single-frequency tone with a radio frequency signal received from the radio frequency antenna. The at least one amplifier is adapted to amplify the summed signal, and the remote unit is operable to transmit the amplified signals over a transmission link to a host unit so that the host unit can determine a gain in a system that includes the remote unit, the host unit and the transmission link.

Yet another aspect of the present invention provides a host unit operable to receive a signal transmitted over a transmission link. The host unit includes a pilot tone receiver adapted to receive the signal transmitted from a remote unit. The signal includes a broadband signal and a single-frequency tone signal. The pilot tone receiver is further adapted to strip the single-frequency tone signal from the received signal and to detect an amplitude of the single-frequency tone signal, and to determine a gain within the transmission link, so that the host unit can determine the gain in a system that includes the remote unit, the host unit and the transmission link.

Yet another aspect of the present invention provides a remote unit communicable with a radio frequency antenna. The remote unit includes at least one amplifier adapted to amplify a radio frequency signal received from the radio frequency antenna, a double down-converter including filters, and a data transport circuit. The double down-converter is adapted to generate a double down-converted broadband signal from the signal received from the at least one amplifier. The data transport circuit is adapted to transmit the double down-converted signal over a transmission link to a host unit so that the host unit can determine a noise-level in a system that includes the remote unit, the host unit and the transmission link.

Yet another aspect of the present invention provides a host unit operable to receive a signal transmitted over a transmission link. The host unit includes a data transport circuit adapted to receive a double-down converted broadband signal that was transmitted from a remote unit, a noise floor detector circuit adapted to detect a noise-level of the signal at a narrow band frequency range outside the frequency range of the double-down converted broadband signal, and a controller adapted to determine if the detected noise level is within an acceptable noise level for a system that includes the remote unit, the host unit and the transmission link.

Yet another aspect of the present invention provides a system to monitor gain in a remote unit. The remote unit is in communication with a radio frequency antenna and a host unit of broadband radio frequency transport system. The system includes a pilot tone generator, a summing circuit, and at least one amplifier, and a controller. The pilot tone generator is adapted to generate at least one single-frequency tone having a known power level. The summing circuit is operably associated with the pilot tone generator and is adapted to sum the single-frequency tone with the respective received radio frequency signal. The amplifier amplifies the summed signal and transmits the signal over a respective transmission link to a host unit. The remote pilot tone receiver is adapted to receive the amplified summed signal and detect the at least one single-frequency tone. The controller is adapted to determine a gain within the remote unit and to determine if the gain is in a preset range of gains based on the power level of the received pilot tone.

Yet another aspect of the present invention provides a system to monitor gain in a host unit of a broadband radio frequency transport system. The system includes a host unit adapted to receive a signal transmitted over a transmission link from a remote unit. Each host unit includes a host pilot tone generator adapted to generate at least one single-frequency tone having a known power level, a pilot tone receiver circuit adapted to receive the at least one single-frequency tone, and a controller adapted to determine a gain within the host unit and to determine if the gain is in a preset range of gains based on the power level of the received pilot tone.

DRAWINGS

Embodiments of the present invention can be more easily understood and further advantages and uses thereof more readily apparent, when considered in view of the description of the preferred embodiments and the following figures in which:

FIG. 1 illustrates a reverse path transport link in accordance with a first embodiment of the present invention.

FIG. 1A illustrates a reverse path transport link in accordance with a second embodiment of the present invention.

FIGS. 5A and 5B show the position of exemplary pilot tones with respect to the frequency spectrum of FIGS. 3A and 3B, respectively.

In accordance with common practice, the various described features are not drawn to scale but are drawn to emphasize features relevant to the present invention. Reference characters denote like elements throughout figures and text.

DETAILED DESCRIPTION

Figure 2:
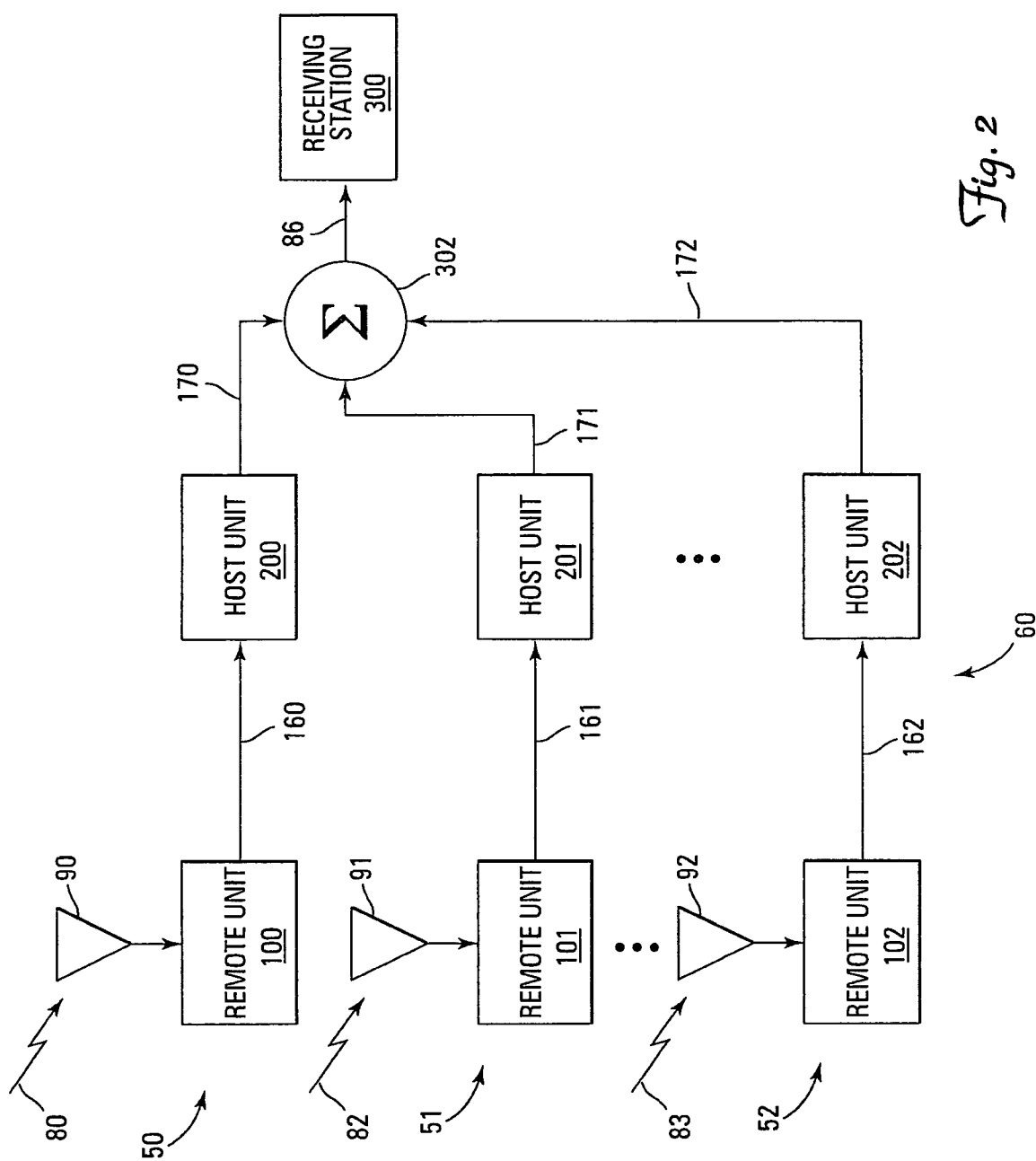
FIG. 2 illustrates a broadband transport system including a plurality of reverse path transport links in communication with a receiving station in accordance with an embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The broadband transport systems described herein are wideband radio frequency transport systems such a cellular wireless systems in which multiple signals within the broad band spectra (as shown in FIGS. 3A and 3B) are simultaneously transmitted and received. FIGS. 1-2, 4 and 6-11 describe embodiments of systems, portions of systems, and methods to monitor the gain within the reverse links of broadband transport systems in order to determine if one or more of the reverse links is degraded without troubleshooting each system after a problem is recognized at a receiving station. FIGS. 12-15 describe embodiments of systems, portions of systems, and methods to monitor the a noise floor within the reverse links of broadband transport systems in order to determine if one or more of the reverse links is degraded without troubleshooting each system after a problem is recognized at a receiving station.

FIG. 1 illustrates a reverse path transport link 50 in accordance with a first embodiment of the present invention. The radio frequency antenna 90 receives a radio frequency signal 80. The reverse path transport link 50 includes a remote unit 100 communicable with the radio frequency antenna 90 and a host unit 200 that receives a signal transmitted from the remote unit 100 over a transmission link 160. The host unit 200 is communicable with a receiving station 300. The connection to the receiving station can be hard wired, as indicated by connection 170, or wireless as indicated by connection 170A.

In one implementation of this embodiment, the radio frequency antenna 90 is a first radio frequency antenna, and the connection 170A to the receiving station 300 is established via at least one second radio frequency antenna 190. In another implementation of this embodiment, the connection 170A to the receiving station is established via a free-space optical link. In this case, a line-of-sight exists between the host unit 200 and the receiving station 300. In yet another implementation of this embodiment, the connection 170 to the receiving station is established via a physical media. For example, the communication between the host unit 200 and the receiving station 300 is over a hard wire connection such as a coaxial cable, optical fiber, or other broadband media.

The transmission link 160 is an optical fiber link, a free-space optical link, a millimeter wave link, a coaxial cable link, a twisted-pair cable link, a broadband transmission link, a wireless transmission link, a physical medium transmission link, or a combination of one or more of these.

The receiving station 300 is a cellular station, a personal communication system (PCS) base station, an Advanced Wireless Services (AWS) base station, or a Universal Mobile Telecommunications System (UMTS) base station. The term base station is also referred to as a "base station transceiver substation."

The remote unit 100, the transmission link 160 and the host unit 200 operate as a repeater station for the radio frequency signal 80. The information transmitted to the receiving station 300 via connection 170 or 170A is substantially the same as the information on the radio frequency signal 80, but it is amplified after being transmitted through the reverse path transport link 50. In another implementation of this embodiment, the broadband transport system 50 is a simulcast transmission system.

FIG. 1A illustrates a reverse path transport link 55 in accordance with a second embodiment of the present invention. Reverse path transport link 55 includes a remote unit 109 communicable with a radio frequency antenna 90 and a host unit 209 that receives a digital signal transmitted from the remote unit 109 over a transmission link 160. The host unit 209 is communicable with a receiving station 300 via connection 170. The reverse path transport link 55 differs from reverse path transport link 50 in that the remote unit 109 includes an analog-to-digital circuit (A/D) 111 that remote unit 100 does not include and the host unit 209 includes a digital-to-analog circuit (D/A) 222 that remote unit 200 does not include. The analog-to-digital circuit (A/D) 111 converts the analog radio frequency signal received at antenna 90 to digital signal before it is transmitted over the transmission link 160. The digital-to-analog circuit (D/A) 222 converts the received digital signal into an analog signal.

Figure 3:
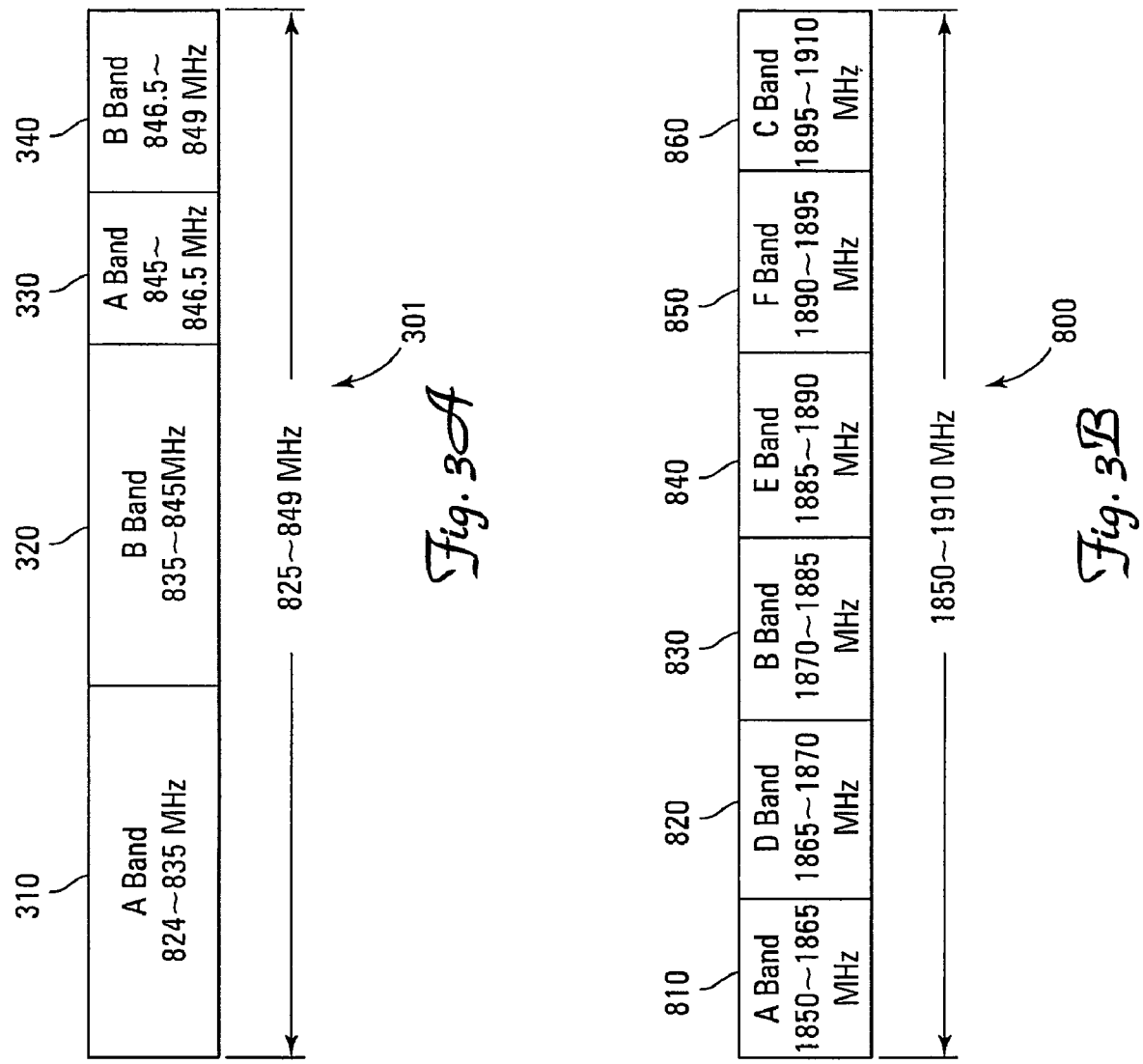
FIGS. 3A and 3B show exemplary broadband frequency spectra and sub-bands within the frequency spectra.

FIG. 2 illustrates a broadband radio frequency transport system 60 including a plurality of reverse path transport links 50, 51 and 52 in communication with a receiving station 300 in accordance with the first embodiment of the present invention. The broadband radio frequency transport system 60 supports multiple air interfaces to different locations for multiple customers. Reverse path transport links 51 and 52 are similar in function and structure to the reverse path transport link 50 as described above with reference to FIG. 1. The reverse path transport link 51 and reverse path transport link 52 each receive a respective radio frequency signal 82 and 83. The reverse path transport link 51 includes remote unit 101, host unit 201 and transmission link 161, and the radio frequency antenna 91. Reverse path transport link 52 includes remote unit 102, host unit 202 and transmission link 162, and the radio frequency antenna 92.

The host unit 200 is communicable with a summation circuit 302 via connection 170. The host unit 201 is communicable with a summation circuit 302 via connection 171. The host unit 202 is communicable with a summation circuit 302 via connection 172.

A summation circuit 302 sums the signals received via connections 170-172 and transmits the summed signal via connection 86 to the receiving station 300. In one implementation of an embodiment of broadband radio frequency transport system 60, the summation circuit 302 is internal to the receiving station 300. In another implementation of an embodiment of broadband radio frequency transport system 60, the summation circuit 302 is external to the receiving station 300 and can additionally include the base station's main antenna input. In yet another implementation of an embodiment of broadband radio frequency transport system 60, the host units 200, 201 and 202 and the summation circuit 302 are internal to the receiving station 300.

The radio frequency signals 80-83 are broadband and include one or more sub-bands within a defined frequency spectrum. FIGS. 3A and 3B show exemplary broadband frequency spectra and sub-bands within the frequency spectra 301.

FIG. 3A shows exemplary broadband frequency spectra 301 with sub-bands 310-340. Broadband frequency spectrum 301 includes a range of frequencies from 824 MHz to 849 MHz that are available for use in communication systems. A sub-band is an arbitrary bandwidth grouping that accommodates one or more standard bandwidths. Sub-band 310 is an A band and spans the range of frequencies from 824 MHz to 835 MHz. Sub-band 320 is a B band and spans the range of frequencies from 835 MHz to 845 MHz. Sub-band 330 is an A band and spans the range of frequencies from 845 MHz to 846.5 MHz. Sub-band 340 is a B band and spans the range of frequencies from 846.5 MHz to 849 MHz.

FIG. 3B shows exemplary broadband frequency spectra 800 with sub-bands 810-860. Broadband frequency spectrum 800 includes a range of frequencies from 1850 MHz to 1910 MHz that are also available for use in communication systems. Sub-band 810 is an A band and spans the range of frequencies from 1850 MHz to 1865 MHz. Sub-band 820 is a D band and spans the range of frequencies from 1865 MHz to 1870 MHz. Sub-band 830 is a B band and spans the range of frequencies from 1870 MHz to 1885 MHz. Sub-band 840 is an E band and spans the range of frequencies from 1885 MHz to 1890 MHz. Sub-band 850 is an F band and spans the range of frequencies from 1890 MHz to 1895 MHz. Sub-band 860 is a C band and spans the range of frequencies from 1895 MHz to 1910 MHz.

Figure 4:
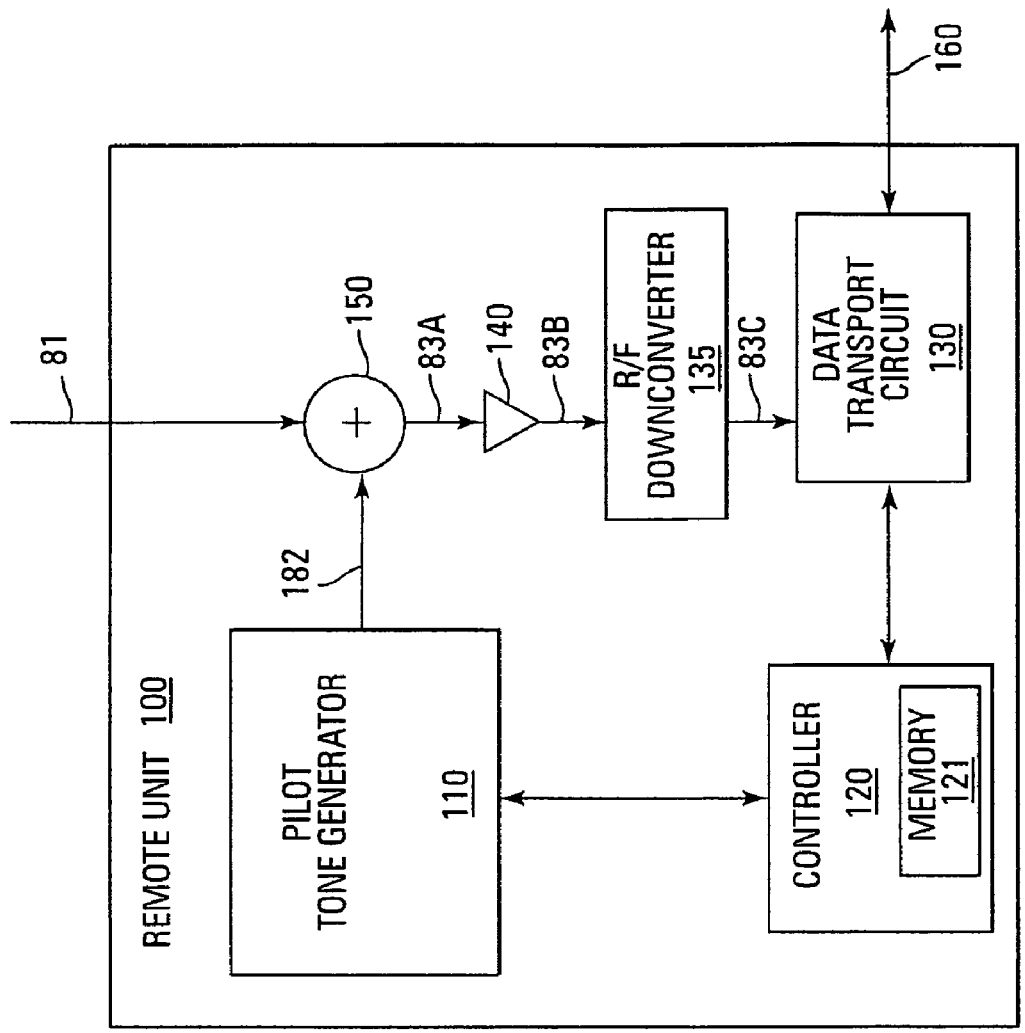
FIG. 4 illustrates a remote unit in a broadband transport system in accordance with an embodiment of the present invention.

FIG. 4 illustrates an embodiment of a remote unit 100 in a broadband radio frequency transport system 60 in accordance with the present invention. The remote unit 100 is operable to monitor the associated reverse link in the broadband radio frequency transport system 60 by adding a single-frequency tone to the broadband signal before amplification and conditioning of the signal for transmission over the transmission link 160. Remote unit 100 includes a pilot tone generator 110, a signal summing circuit 150, an amplifier 140, an RF down-converter circuit 135, a data transport circuit 130, and a controller 120. The controller 120 includes a memory 121. Down-converter is used in this embodiment but is not needed in other embodiments.

The pilot tone generator 110 is adapted to generate at least one single-frequency tone 182 having a known power level. A pilot tone is a single-frequency analog tone, thus, the terms "pilot tone" and "single-frequency tone" are interchangeably used in this document.

The signal summing circuit 150 operably associated with the pilot tone generator 110 is adapted to add the single-frequency tone 182 to the respective received broadband radio frequency signal 81. Amplifier 140 is in communication with the summing circuit 150. Amplifier 140 receives the summed signal 83A from the signal summing circuit 150. The amplifier 140 is adapted to amplify the summed signal 83A and output the amplified signal 83B to the RF down-converter circuit 135. The RF down-converter circuit 135 performs a frequency translation on the summed signal 83B using radio frequency filter and mixing circuitry as known in the art. Frequency translation is not done in other embodiments. The data transport circuit 130 is in communication with the RF down-converter 135 and the controller 120. The data transport circuit 130 receives the down-converted signal 83C from the RF down-converter 135. The data transport circuit 130 is adapted to transmit and receive information over the transmission link 160. It has the ability to transmit information over the transmission link 160 that is representative of the signal 83C that it receives from the RF down-converter circuit 135. The functionality of remote unit 100 is the same as the functionality of remote units 101 and 102 (FIG. 2). In one implementation of the remote unit 100, the amplifier 140 is a low noise RF amplifier.

FIGS. 5A and 5B show the position of exemplary pilot tones with respect to the frequency spectra of FIGS. 3A and 3B, respectively. In FIG. 5A, exemplary pilot tones 350 and 360 are shown in frequency spectrum 305 in relative position to the frequency spectrum 301 of FIG. 3A. Likewise in FIG. 5B, exemplary pilot tones 570 and 580 are shown in frequency spectrum 505 in relative position to the frequency spectrum 800 of FIG. 3B.

As shown in FIG. 5A, one of the single-frequency tones 360 is at a frequency above the defined frequency spectrum 301 by frequency offset Δv. Another of the single-frequency tones 350 is at a frequency below the defined frequency spectrum 301 by frequency offset Δv. The frequency offset Δv is indicative of a range of frequency offsets. The single-frequency tone or tones are positioned at a frequency or frequencies to minimize interference with received in-band radio frequency signals including frequencies above and below the frequency of the single-frequency tone or tones. In one implementation of the embodiment of FIG. 5A, the frequency offset Δv is about equal to 100 KHz. In another implementation of the embodiment of FIG. 5A, the one or more single-frequency tones are at frequencies within the frequency spectrum 301. The frequency offset Δv is chosen to minimize overlap and/or interference with the services in the bands above or below the defined frequency spectrum by avoiding carrier frequencies for these services.

As shown in FIG. 5B, one of the single-frequency tones 580 is at a frequency above the defined frequency spectrum 500 by frequency offset Δv. Another of the single-frequency tones 570 is at a frequency below the defined frequency spectrum 500 by frequency offset Δv. In one implementation of the embodiment of FIG. 5B, the frequency offset Δv is about equal to 100 KHz. In another implementation of the embodiment of FIG. 5A, the one or more single-frequency tones are at frequencies within the frequency spectrum 500.

Figure 6:
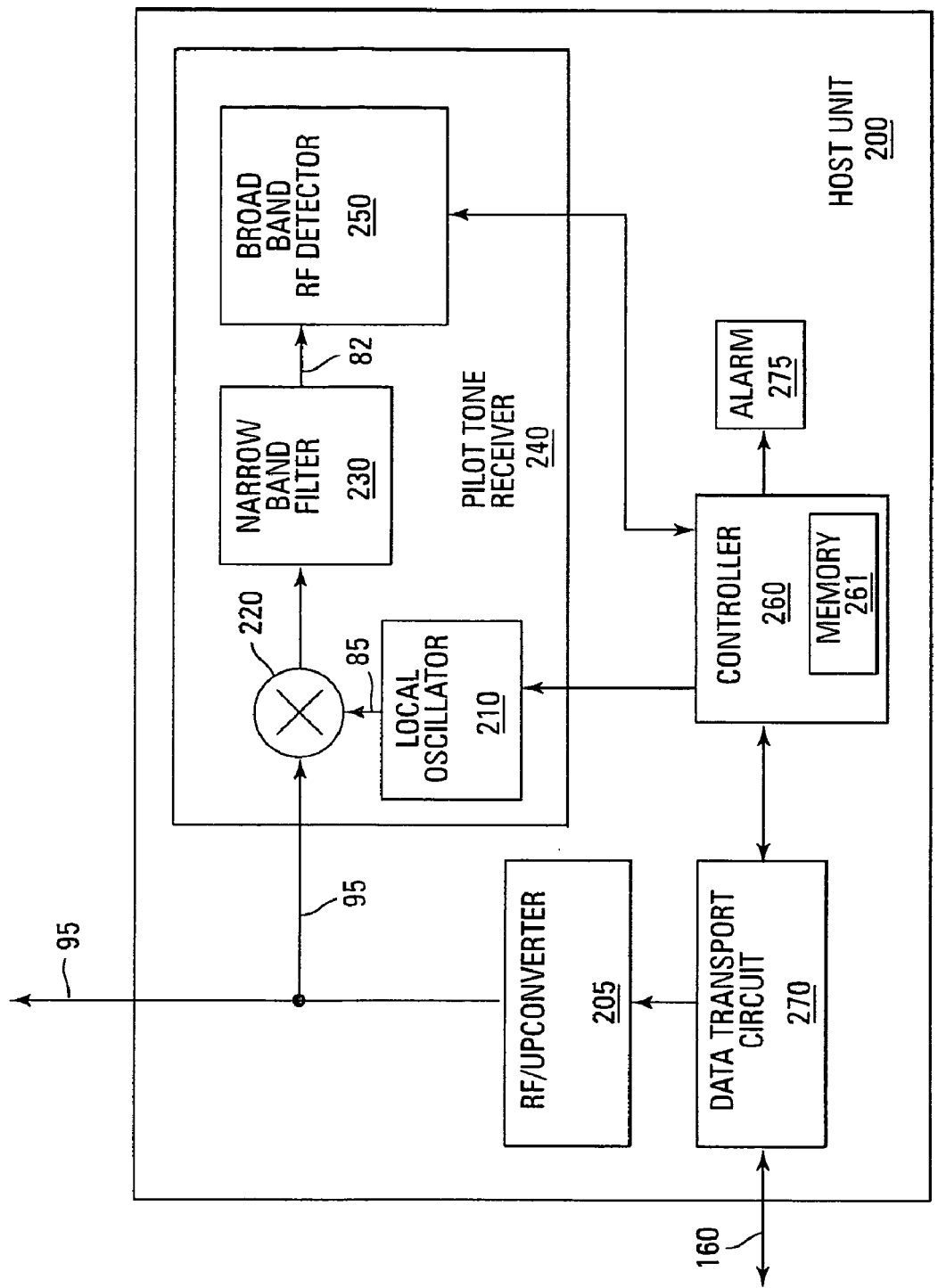
FIG. 6 illustrates a host unit in a broadband transport system in accordance with an embodiment of the present invention.

FIG. 6 illustrates an embodiment of a host unit 200 in a broadband radio frequency transport system 60 (FIG. 1) in accordance with the present invention. The host unit 200 transmits and receives information over the transmission link 160. Based on the information that is received over the transmission link 160, the host unit 200 is adapted to construct a transported RF signal 95 that resembles an amplitude scaled version of the original summed signal 83A constructed in the remote unit 200. A pilot tone receiver 240 inside the host down-converts the transported RF signal 95 and determines the gain in amplitude of the single-frequency tone 182 (FIG. 4) that was transported through the system 50. The single-frequency tone 182 is periodically generated at the remote unit 100 to periodically monitor the broadband radio frequency transport system 60. Down-conversion is not used in other embodiments.

As shown in FIG. 6, the host unit 200 includes a data transport circuit 270, an RF up-converter circuit 205, a controller 260, a pilot tone receiver 240, and an alarm 275. The RF up-converter is not used in other embodiments of this invention. The pilot tone receiver 240 includes a mixer 220, a local oscillator 210, a narrow band filter 230, and a broadband radio frequency detector 250. The controller 260 includes a memory 261. Memory 261 comprises any suitable memory now known or later developed such as, for example, random access memory (RAM), read only memory (ROM), and/or registers within the controller 260. In one implementation, the controller 260 comprises a microprocessor or microcontroller. Moreover, although the memory 261 is shown internal to the controller 260 in FIG. 4, the memory 261 and controller 260 are separate devices in one implementation. The software and/or firmware executed by the controller 260 comprises a plurality of program instructions that are stored or otherwise embodied on a storage medium, such as memory 261, from which at least a portion of such program instructions are read for execution by the controller 260.

Figure 7:
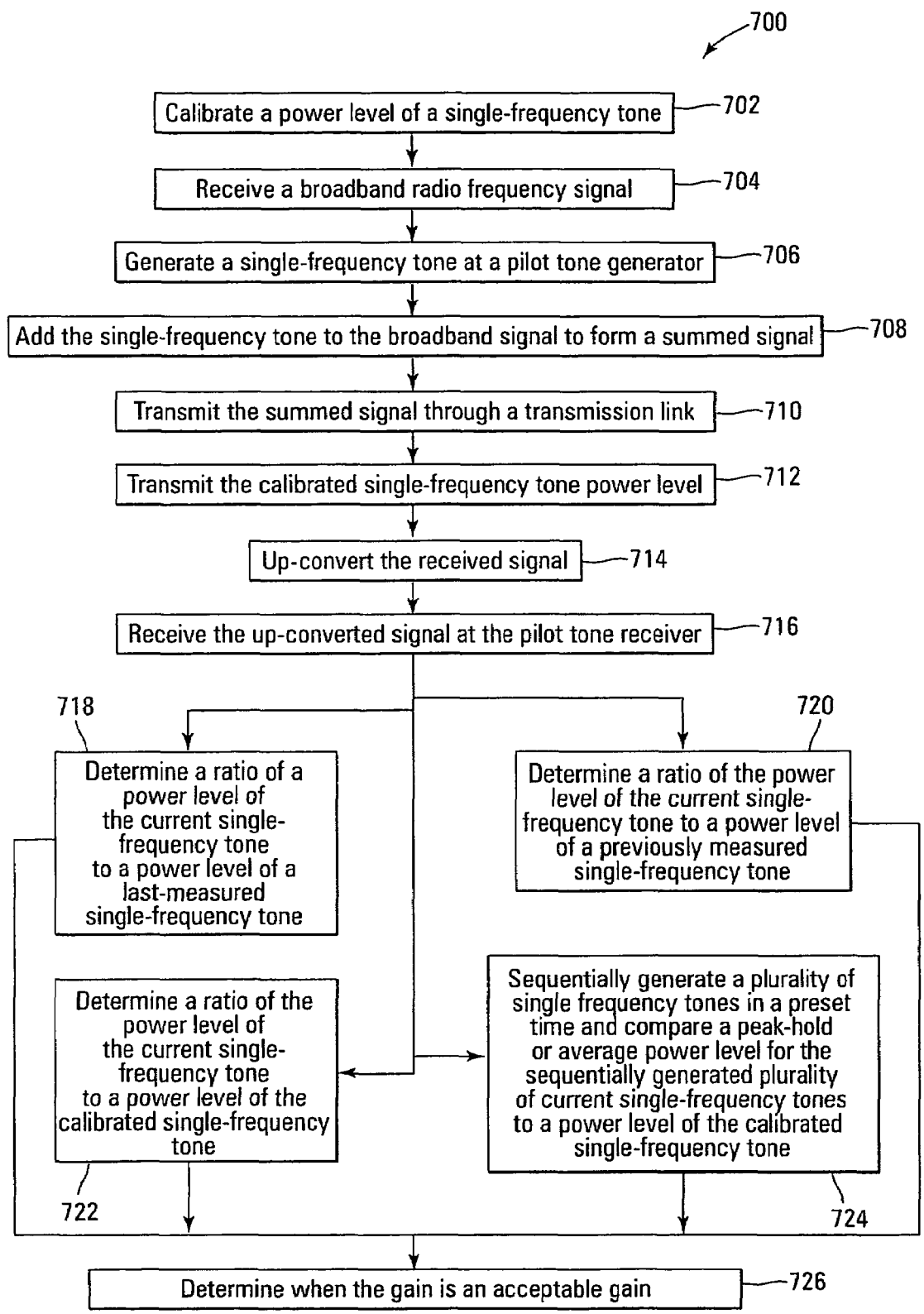
FIG. 7 is a flow diagram illustrating a method to monitor gain in a broadband transport system in accordance with an embodiment of the present invention.

FIG. 7 is a flow diagram 700 illustrating a method to monitor gain in a broadband radio frequency transport system 60 in accordance with an embodiment of the present invention. Flow diagram 700 is described with reference to the remote unit 100 as shown in FIG. 4 and the host unit 200 as shown in FIG. 6.

Flow diagram 700 is also described with reference to exemplary broadband and pilot tone spectra shown in FIGS. 5A and 5B. In one implementation of the embodiment of flow diagram 700, the received broadband radio frequency signal 81 (FIG. 4) is within a defined frequency spectrum 301 of FIG. 3A. In yet another implementation of the embodiment of flow diagram 700, the received broadband radio frequency signal 81 (FIG. 4) is within a frequency spectrum 500 of FIG. 3B.

The controller 120 executes software and/or firmware that causes the controller 120 to perform at least some of the processing described here as being performed by the remote unit 100. At least a portion of such software and/or firmware executed by the controller 120 and any related data structures are stored in memory 121 during execution. The software and/or firmware executed by the controller 120 comprises a plurality of program instructions that are stored or otherwise embodied on a storage medium, such as memory 121, from which at least a portion of such program instructions are read for execution by the controller 120. Memory 121 comprises any suitable memory now known or later developed such as, for example, random access memory (RAM), read only memory (ROM), and/or registers within the controller 120. In one implementation, the controller 120 comprises a microprocessor or microcontroller. Moreover, although the memory 121 is shown internal to the controller 120 in FIG. 4, the memory 121 and controller 120 are separate devices in one implementation.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-R, DVD, and other optical disks. Any of the foregoing may be supplemented by, or incorporated in, specially-designed application-specific integrated circuits (ASICs).

The controller 120 in the remote unit 100 calibrates a power level of the single-frequency tone (block 702). The calibration process is performed during an initialization phase of the broadband radio frequency transport system 60 and is not repeated unless another calibration is scheduled and/or needed. The calibrated single-frequency tone power level is stored in the memory 121 within controller 120. The single-frequency tone power level is also transmitted to the host unit 200 linked via transmission link 160 for storage within the memory 261 within controller 260 of remote unit 200.

In one implementation of block 702, the power level of the single-frequency tone is calibrated against an internal threshold point that is used to limit the gain of the reverse link when the input signal is too high. In this case, the threshold point is hard programmed into the controller 120. In this embodiment, the output of the pilot tone generator 110 is adjusted to a precise level below the gain limit threshold. In one implementation of this embodiment, the output of the pilot tone generator 110 is adjusted precisely to a separate threshold level that is dedicated for the purpose of tone calibration and is hard programmed in the controller 120.

The remote unit 100 receives the broadband radio frequency signal 81 (block 704) from the antenna 90 (FIG. 1). At block 706, the pilot tone generator 110 generates at least one single-frequency tone 182 at a frequency determined as described above with reference to block 702. The single-frequency tone 182 is a pilot tone, such as pilot tone 350, 360, 570 or 580 as described above with reference to FIGS. 5A and 5B. In one implementation of the pilot tone generator 110, the power level of the tone is controlled with a voltage variable attenuator and an output level detector that provides feedback. The single-frequency tone 182 has a known power level that is equal to the power level of the calibrated single-frequency tone. The desired transmit level of the pilot tone is set by a program in the controller 120. The controller 120 initiates the generation of the tone according to one or more programs in the controller 120.

A radio frequency synthesizer generates the pilot tone at the desired frequency using an external or an internal reference. The frequency can be programmed for the desired frequency and the pilot tone can be turned on and off. In one implementation of an embodiment of the pilot tone generator 110, the pilot tone is periodically generated. In this manner, the flow diagram 700 of monitoring gain in a broadband radio frequency transport system 60 is periodically implemented. In an exemplary case, the gain in broadband radio frequency transport system 60 is monitored every 15 minutes when a pilot tone is generated. In another exemplary case, the gain in broadband radio frequency transport system 60 is monitored every hour when the pilot tone is generated.

The summing circuit 150 receives the single-frequency tone 182 from the pilot tone generator 110. The summing circuit 150 adds the single-frequency tone 182 to the received broadband radio frequency signal 81 (block 708) and generates summed signal 83A. Summing circuits are known in the art and are not described herein. The summed signal 83A is amplified and output from amplifier 140 to form amplified signal 83B. The amplified summed signal 83B is down-converted by the RF down-converter 135 and input as signal 83C to the data transport circuit 130. The data transport circuit 130 transmits the summed signal through the transmission link 160 (block 710). In one embodiment of flow diagram 700, the calibrated single-frequency tone power level is transmitted from the remote unit 100 via the transmission link 160 to the host unit 200 (block 712). Down-conversion is not required in other embodiments of this invention.

The data transport circuit 270 in the host unit 200 receives the transmitted signal 83C. The data transport circuit 270 inputs the received signal to the RF up-converter 205. The RF up-converter 205 up-converts the received signal (block 714) and outputs signal 95. Both the single-frequency signal and the broadband signal in the received signal are up-converted. The up-converted signal 95 is received at the pilot tone receiver 240 (block 716). Up-conversion is not required in other embodiments of this invention.

The pilot tone receiver 240 strips the single-frequency tone 182 from signal 95 and detects the amplitude of the single-frequency tone 182. A local oscillator 210 in the pilot tone receiver 240 generates the local oscillator signal 85 which is mixed at the mixer 220 with the up-converted signal 95. The narrow band filter 230 is tuned to the frequency translation of the single-frequency tone 182 resulting from the mixing operation. In one implementation of this embodiment, the system is designed for a narrow band filter 230 tuned to a fixed frequency of 45 MHz. Other system designs for other frequencies are possible. The narrow band filter 230 outputs the frequency translated single-frequency tone signal 82. The broad band RF detector 250 receives the frequency translated single-frequency tone signal 82 that is output from the narrow band filter 230 as a current single-frequency tone. The power level of the single-frequency tone signal 82 is measured at the broad band RF detector 250. As defined herein, the current single-frequency tone is the single-frequency tone that is received during an ongoing monitoring event for the broadband radio frequency transport system 60.

While the signal level for the single-frequency tone signal 82 is measured, the host unit 200 transmits the signal 95 that is associated with the radio frequency signal 80 received at the antenna 90 of the remote unit 100 to the receiving station 300 via connection 170 (FIG. 1).

In an implementation of an embodiment in which the signal 83C is digitized in the data transport circuit 130, the digital signal received at the host unit 200 is converted back to an analog signal by the data transport circuit 270 before being mixed by the mixer 220 with a signal from the local oscillator 210.

In an exemplary case, the broadband spectral range includes the EFC sub-bands of spectrum 500 in FIG. 5B and the single-frequency tone is generated above the frequency spectral range at the frequency of 1910.104 MHz. The local oscillator signal, at a frequency of 1955.104 MHz, is 45 MHz higher in frequency than the single-frequency tone. When the EFC sub-bands and the single-frequency tone are down-converted by the local oscillator, the down-converted pilot tone is below the low end of the down-converted EFC sub-bands.

At blocks 718-724, the controller 260 uses one or more optional methods to determine the gain of the single-frequency signal 82 after it was transmitted from the remote unit 100 to the host unit 200 via the reverse path transport link 50. The one or more of the methods described with reference to blocks 718, 720, 722 and 724 are implemented by the controller 260 in the host unit 200 to determine a ratio of power levels.

At block 718, the controller 260 determines a ratio of a power level of the current single-frequency tone to a power level of a last-measured single-frequency tone. The power level of the current single-frequency tone is the power level of the signal 82 received at the pilot tone receiver 240 when the most recent pilot tone was generated at the remote unit 100 during the current monitoring event.

A monitoring event occurs each time flow diagram 700, from blocks 704-726, is implemented. Since the pilot tone is generated periodically, the last-measured single-frequency tone power level is the power level of the signal 82 received at the pilot tone receiver 240 during the last monitoring event. In the case in which the pilot tone is generated once an hour, the last-measured single-frequency tone power level is the power level of the signal 82 received at the pilot tone receiver 240 about an hour ago. The log of ratios of the power level of the current single-frequency tone to a power level of a last-measured single-frequency tone indicates a change in the gain in the transmission link in the broadband radio frequency transport system 60. In this case, the broadband radio frequency transport system 60 monitors for drastic changes in the gain over short periods of time.

The controller 260 is adapted to trigger an alarm 275 to generate a warning based on a determination that the difference in gain between the periodically generated single-frequency tones is greater than a selected threshold. In one implementation of this embodiment, the selected threshold is 6 dB so that deterioration in the gain of more than 6 dB generates a warning.

In one implementation of this embodiment, the broadband radio frequency transport system 60, the controller 260 is adapted to trigger the alarm 275 to generate a warning based on a determination that the gain between the periodically generated single-frequency tones has degraded by 6 dB or more than 6 dB. In one implementation of this embodiment, the broadband radio frequency transport system 60 monitors for a drop in gain of more than 6 dB in one hour.

At block 720, the controller 260 determines a ratio of the power level of the current single-frequency tone to a power level of a previously-measured single-frequency tone. The power level of a previously-measured single-frequency tone is the power level of the signal 82 received at the pilot tone receiver 240 during a monitoring event that occurred prior to the last monitoring event. Such a monitoring event occurs more than two periods ago. In the case in which the pilot tone is generated once every five minutes, the previously-measured single-frequency tone power level is the power level of the signal 82 received at the pilot tone receiver 240 more than nine minutes ago. The log of ratios of the power level of the current single-frequency tone to a power level of a previously-measured single-frequency tone indicates a change in the gain in the transmission link in the broadband radio frequency transport system 60. In this case, the broadband radio frequency transport system 60 monitors for slow drifts in the gain.

At block 722, the controller 260 determines a ratio of the power level of the current single-frequency tone to the power level of the calibrated single-frequency tone. As defined herein, the current single-frequency tone is the single-frequency tone that is received during an ongoing monitoring event for the broadband radio frequency transport system 60. The controller 260 has the calibrated single-frequency tone level stored in memory 261 from the calibration process as described above with reference to block 702. In one embodiment, the power level of the calibrated single-frequency tone is transmitted with the pilot tone signal from the remote unit 100. The log of ratios of the received power level to the calibrated power level is used to determine if the gain of the signal received is about the desired gain of the reverse path transport link 50. Each sequential pilot tone and/or extended pilot tone is generated, transmitted and received as described above with reference to blocks 706-716.

In one implementation of flow diagram 700, the current single-frequency tone includes a plurality of single-frequency tones that are sequentially generated in a preset time. For example in one implementation of block 724 in flow diagram 700, the plurality of single-frequency tones include two or more frequencies. In an exemplary case of this embodiment, at least one single-frequency tone has a frequency above the in-band frequency and at least one other single-frequency tone has a frequency below the in-band frequency.

Additionally, in another implementation of flow diagram 700, the current single-frequency tone is generated for an extended duration. In an exemplary case of this embodiment, the generation of the single-frequency tone is extended up to 10 seconds. In such an embodiment, the pilot tone is transmitted from the remote unit 100 to the host unit 200 where the power level of the pilot tone is measured many times by the pilot tone receiver 240. The measurements are stored in the controller 260.

At block 724, the controller 260 compares a peak-hold power level or an average power level for the sequentially generated plurality of single-frequency tones to a power level of the calibrated single-frequency tone. In an exemplary case, the pilot tone is sequentially measured 100 times at the host unit 200 during a monitoring event that lasts for the preset time of ten seconds. The highest power level or the average power level for all the 100 transmitted pilot tones is used to determine the gain. The peak-hold function or the averaging function is useful if the communication traffic on the radio frequency signals 80 is very near the single-frequency of the pilot tone signal and they sometimes destructively interfere. If a series of measurements are made and the largest power level is used to determine the gain, then the potential for alarms due to random destructive interference is reduced.

In one implementation of block 724, the controller 260 measures the power level of each of the received single-frequency tones that were sequentially generated in a preset time, takes a peak-hold power level for all the sequential measurements and compares the peak-hold power level to the power level of the calibrated single-frequency tone. A peak-hold function in the controller 260 determines the peak power level for all the pilot tone measurements.

In another implementation of block 724, the controller 260 measures the power level of each of the received single-frequency tones that were sequentially generated in a preset time, takes an average power level for all the measurements and compares the average power level to the power level of the calibrated single-frequency tone. An averaging function in the controller 260 determines the average power level for all the pilot tone measurements.

In yet another implementation of block 724, the controller 260 takes sequential measurements of the single-frequency tone that was generated for an extended duration, takes a peak-hold power level for all the sequential measurement and compares the peak-hold power level to the power level of the calibrated single-frequency tone.

In yet another implementation of block 724, the controller 260 takes sequential measurements of the single-frequency tone that was generated for an extended duration, takes an average power level of all the sequential measurements and compares the average power level to the power level of the calibrated single-frequency tone.

The log of the ratio of the peak-hold power level to the calibrated single-frequency tone power level is used to determine if the gain of the signal received is about the desired gain of the reverse path transport link 50. Likewise, the log of the ratio of the average power level to the calibrated single-frequency tone power level is used to determine if the gain of the signal received is about the desired gain of the reverse path transport link 50.

At block 726, the controller 260 determines if the gain is an acceptable gain. The controller 260 has stored in memory 261, the acceptable gain and compares the current gain with the acceptable gain. In one implementation of this embodiment of flow diagram 700, the acceptable gain is a range of gains. If the broadband radio frequency transport system 60 monitors for drifts in the gain, as described above with reference to blocks 718 and 720, then the controller 260 has stored in memory 261 acceptable changes in the power levels or log of the ratios of the power levels. In one implementation of this embodiment of flow diagram 700, the controller 260 determines a percentage change in power level during block 720 and compares the measured percentage change in power level with an acceptable percentage change in power level that is stored in memory 261. If the gain and/or percentage change is not within the acceptable range the controller 260 triggers the alarm 275 and the alarm 275 generates a warning based on the determination.

Figure 8:
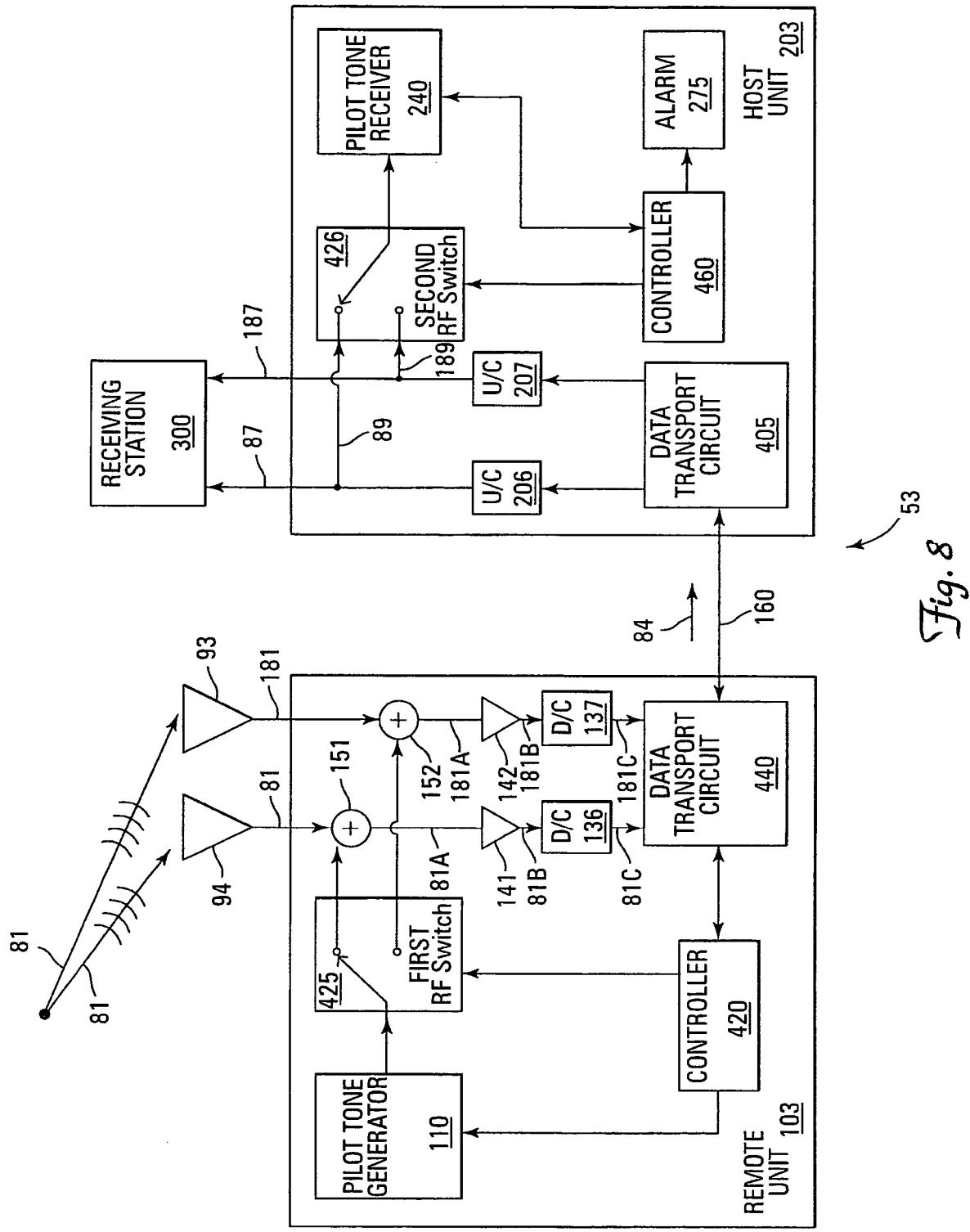
FIG. 8 illustrates a redundant reverse path transport link in accordance with a third embodiment of the present invention.

FIG. 8 illustrates a redundant reverse path transport link 53 in accordance with a third embodiment of the present invention. Reverse path transport link 53 includes a remote unit 103 communicable with a first radio frequency antenna 94 and a second radio frequency antenna 93, a transmission link 160, and a host unit 203 that receives a signal transmitted from the remote unit 103 over the transmission link 160. The host unit 203 communicates the radio frequency signal 87 to a receiving station 300. The information on the radio frequency signal 87 is substantially the same information as on the radio frequency signal 81, but it is amplified after being transmitted through the reverse path transport link 53. Reverse path transport link 53 operates in a manner to similar to the reverse path transport link 50, thus generates a single-frequency tone to monitor gain in the reverse path transport link 53. However, the reverse path transport link 53 provides path diversity that is not available in the reverse path transport link 50. As is understandable from the discussion regarding FIG. 3, a plurality of reverse transport links 53 can communicate with the same receiving station 300. The remote unit 103, the transmission link 160 and the host unit 203 operate as a redundant repeater station for the radio frequency signal 81.

The remote unit 103 includes a pilot tone generator 110, a first radio frequency switch 425, a controller 420, a data transport circuit 440, a first signal summing circuit 151, a second signal summing circuit 152, an amplifier 141, an amplifier 142, a down-converter (D/C) 136 and a down-converter (D/C) 137. Not all embodiments use down-converters. The first radio frequency antenna 94 outputs signal 81 to summing circuit 151. A second radio frequency antenna 93 outputs signal 181 to summing circuit 152. Signal 181 includes information that is substantially the same as the information on signal 81.

The first radio frequency switch 425 in the remote unit 103 transmits the single-frequency tone signal, such as single-frequency tones 350, 360, 570, and/or 580 as described above with reference to FIGS. 5A and 5B, to the either the first signal summing circuit 151 or the second signal summing circuit 152. The signal summing circuit that receives the single-frequency tone signal sums the single-frequency tone with the received broadband radio frequency signal.

As shown in FIG. 8, the first radio frequency switch 425 is configured to output a single-frequency tone signal to first signal summing circuit 151. The first signal summing circuit 151 adds the single-frequency tone signal to the signal 81. The summed signal 81A is output from the first signal summing circuit 151 and is amplified at the amplifier 141. The down-converter 136 receives the amplified signal 81B output from the amplifier 141 and outputs the down-converted signal 81C to the data transport circuit 440.

The second signal summing circuit 152 does not receive a single-frequency tone signal from first radio frequency switch 425 in the illustrated embodiment. Thus, the second signal summing circuit 152 outputs signal 181A, which is substantially the same as signal 181. The signal 181A includes information that is substantially the same as the information on summed signal 81A but signal 181A does not include the single-frequency tone signal.

Signal 181A is amplified at the amplifier 142. The down-converter 137 receives amplified signal 181B output from the amplifier 142 and outputs the down-converted signal 181C to the data transport circuit 440. Not all embodiments use down-converters.

The data transport circuit 440 receives signals 81C and 181C from the down-converters 136 and 137, respectively. The data transport circuit 440 transmits a signal, indicated as arrow 84, which includes signal 81C and signal 181C over transmission link 160. In this manner, the remote unit 103 transmits redundant signals 84 over transmission link 160.

The data transport circuit 440 is in communication with the controller 420. The controller 420 in the remote unit 103 includes the functional capability of controller 120 (FIG. 4) as well as the functional capability to control the first radio frequency switch 425 as needed to periodically send the single-frequency tone signal to either the signal summing circuit 151 or the second summing circuit 152. In one implementation of this embodiment, the remote unit 103 includes circuitry to digitize signals.

The host unit 203 includes a pilot tone receiver 240, a second radio frequency switch 426, a controller 460, a data transport circuit 405, up-converter 206, up-converter 207 and alarm 275. The transmitted summed signal 84 is received at the data transport circuit 405 in the host unit 203. Not all embodiments use up-converters. For example, if remote unit 103 does not include down-converters 136 and 137, then host unit 203 does not include up-converters 206 and 207.

The functionality of the data transport circuit 405 is similar to that of the data transport circuit 270 (FIG. 6). However, the data transport circuit 405 outputs two signals, one to radio frequency up-converter (U/C) 206 and the other to radio frequency up-converter (U/C) 207. The two signals are output from radio frequency up-converter 206 and radio frequency up-converter 207 and input to the receiving station 300 via connections 87 and 187 for redundancy. The signal input to connection 87 includes the single-tone frequency signal generated by the pilot tone generator 110 and the signal input to connection 187 does not include the single-tone frequency signal generated by the pilot tone generator 110.

Additionally, the two signals output from radio frequency up-converters 206 and 207 are input to the second radio frequency switch 426 via respective connections 89 and 189. The second radio frequency switch 426 is enabled to input the signal received via connection 89 to the pilot tone receiver 240. The signal received via connection 89 includes the single-tone frequency signal generated by the pilot tone generator 110. The controller 460 controls the switching state of second radio frequency switch 426 to ensure that the signal that includes the single-frequency tone signal is sent to the pilot tone receiver 240.

The controller 460 in the host unit 203 also includes the functional capability of controller 260 (FIG. 6). The controller 460 determines if the gain in the monitored path is an acceptable gain as described for the various embodiments described above with reference to FIGS. 1-7. If the gain and/or percentage change is not within the acceptable range, the controller 260 triggers the alarm 275 and the alarm 275 generates a warning based on the determination. Thus, the radio frequency signal 80 is provided two circuitry paths through the redundant reverse path transport link 53 while the gain and/or percentage change of one of the paths is monitored.

In one implementation of this embodiment of redundant reverse path transport link 53, two transmission links 160 are periodically tested. In another implementation of an embodiment of redundant reverse path transport link 53, the pilot tone generator 110, the pilot tone is periodically generated to monitor two paths. In this embodiment, the first path includes the first signal summing circuit 151, amplifier 141, down-converter 136 and up-converter 206 and the second path includes the second signal summing circuit 152, amplifier 142, down-converter 137 and up-converter 207.

Figure 9:
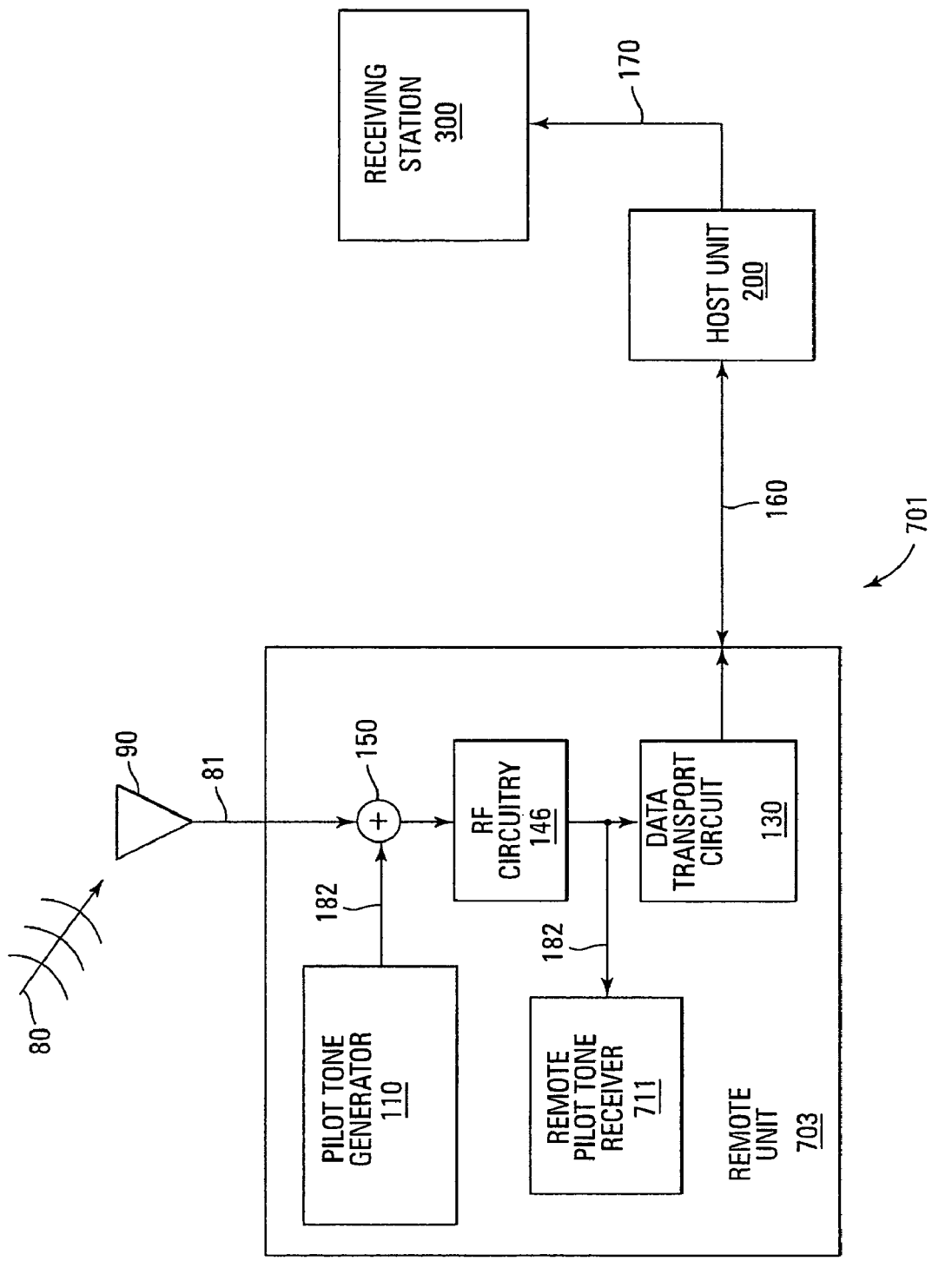
FIG. 9 illustrates a reverse path transport link in accordance with a fourth embodiment of the present invention.

FIG. 9 illustrates a reverse path transport link 701 in accordance with a fourth embodiment of the present invention. The reverse path transport link 701 includes a remote unit 703 communicable with the radio frequency antenna 90 and the host unit 200 that receives a signal transmitted from the remote unit 703 over a transmission link 160. The host unit 200 is communicable with a receiving station 300 via connection 170. The radio frequency antenna 90 receives the radio frequency signal 80.

Remote unit 703 includes elements of remote unit 100 as illustrated in FIG. 4 and a remote pilot tone receiver 711 as illustrated in FIG. 9 in communication with the pilot tone generator 110. The amplifier 140, RF down-converter circuit 135 and the controller 120 of FIG. 4 are shown in FIG. 9 as RF circuitry 146. The remote pilot tone receiver 711 is adapted to detect the single-frequency tone 182 generated by the pilot tone generator 110 to determine a gain within the remote unit 703. The controller 120 (FIG. 4) is in communication with the remote pilot tone receiver 711 and is adapted to determine the gain in the remote unit 703. In one implementation of this embodiment, the gain in the remote unit 703 is transmitted to the controller 260 (FIG. 6) in the host unit 200.

The remote pilot tone receiver 711 receives the amplified summed signal 83C (FIG. 4) and detects the single-frequency tone within the remote unit 703. The remote pilot tone receiver 711 operates in a manner similar to the pilot tone receiver 240 as described above with reference to FIGS. 6 and 7. The amplified summed signal 83C (FIG. 4) is also transmitted to the host unit 200 as described above with reference to FIGS. 4, 6 and 7.

In this manner, the gain is monitored in the reverse path transport link 701 and within the remote unit 703 of reverse path transport link 701. If the gain determined in the host unit 200 is degraded and the gain in the remote unit is not degraded, the gain degradation is then determined to occur in the transmission link 160 and/or the host unit 200.

In one implementation of this embodiment, the reverse path transport link 701 does not include a host unit 200. In such an implementation, the host unit is a conventional host unit and does not include a pilot tone receiver 240 (FIG. 6). In this implementation, the reverse path transport link 701 only monitors the gain of the remote unit 703. In another implementation of this embodiment, the remote unit 703 includes an alarm that is adapted to generate a warning based on a determination that the gain in the remote unit 703 is not in a preset range of gains.

Figure 10:
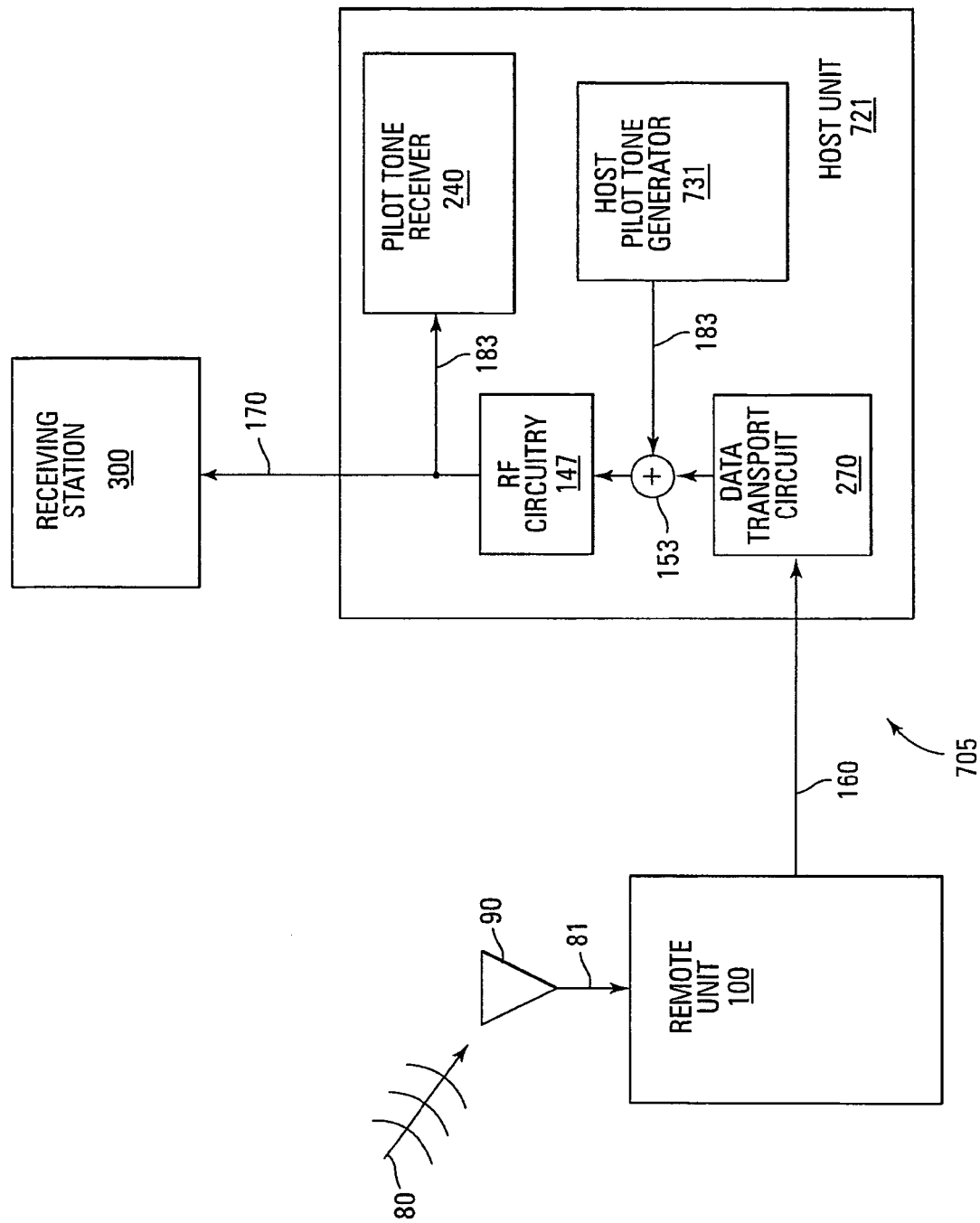
FIG. 10 illustrates a reverse path transport link in accordance with a fifth embodiment of the present invention.

FIG. 10 illustrates a reverse path transport link 705 in accordance with a fifth embodiment of the present invention. The reverse path transport link 705 includes a remote unit 100 communicable with the radio frequency antenna 90 and the host unit 721 that receives a signal transmitted from the remote unit 100 over a transmission link 160. The host unit 721 is communicable with a receiving station 300 via connection 170. The radio frequency antenna 90 receives the radio frequency signal 80.

Host unit 721 includes the elements of host unit 200 as illustrated in FIG. 6 and a host pilot tone generator 731 as illustrated in FIG. 10 in communication with the pilot tone receiver 240. The RF up-converter circuit 205 and controller 260 of FIG. 6 are shown in FIG. 9 as RF circuitry 147. Host pilot tone generator 731 is adapted to generate at least one single-frequency tone 183 having a known power level. The signal summing circuit 153 operably associated with the host pilot tone generator 731 is adapted to add the single-frequency tone 183 to the broadband radio frequency signal output from the data transport circuit 270. In one implementation of this embodiment, the single-frequency tone 183 generated at the host pilot tone generator 731 is at a different frequency than the single-frequency tone 182 generated at the remote unit 100. In another implementation of this embodiment, the single-frequency tone generated at the host pilot tone generator 731 has the same frequency as the single-frequency tone generated at the remote unit 100. In this case, the tones from the host unit 721 and remote unit 100 are not generated and detected at the same time and the controller 260 in the host unit 200 controls the timing of the detection of the two different tones. In an exemplary embodiment, the controller 260 in the host unit 721 coordinates the monitoring activity and the controller 120 in the remote unit 100 functions to execute pilot tone commands issued by the host controller 260. Other system configurations to coordinate the monitoring activity are possible.

The pilot tone receiver 240 is adapted to receive both the amplified the single-frequency tone generated at the remote unit 100 and the single-frequency tone 183 generated at the host pilot tone generator 731. The controller 260 (FIG. 6) is adapted to determine a gain within the host unit 721 and to determine a gain for the reverse path transport link 705.

In this manner, the gain is monitored within the reverse path transport link 705 and within the host unit 721. If the gain determined in the host unit 721 is degraded for the single-frequency tone generated at the remote unit 100 and is not degraded for the single-frequency tone generated at the host unit 721, the gain degradation is then determined to occur in the transmission link 160 and/or the remote unit 100.

In one implementation of this embodiment, the reverse path transport link 705 does not include a remote unit 100. In such an implantation, the remote unit is a conventional remote unit and does not include a pilot tone generator 110 (FIG. 4). In this implementation, the gain is only monitored in the host unit 721 within the reverse path transport link 705. In another implementation of this embodiment, the alarm 275 in the host unit 721 is adapted to generate a warning based on a determination that the gain in the host unit 721 is not in a preset range of gains.

Figure 11:
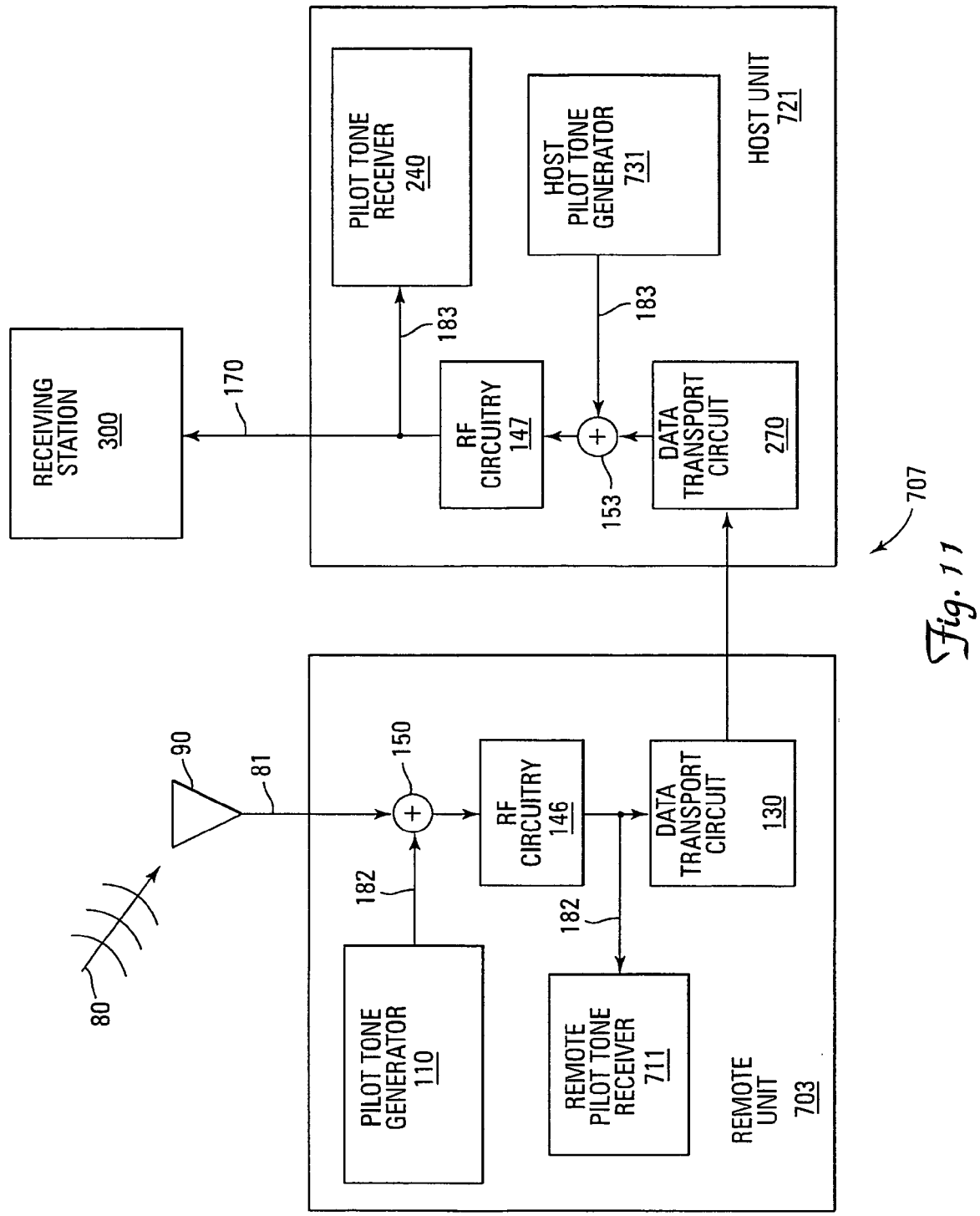
FIG. 11 illustrates a reverse path transport link in accordance with a sixth embodiment of the present invention.

FIG. 11 illustrates a reverse path transport link 707 in accordance with a sixth embodiment of the present invention. The reverse path transport link 707 includes a remote unit 703 communicable with the radio frequency antenna 90 and the host unit 721 that receives a signal transmitted from the remote unit 703 over a transmission link 160. The host unit 721 is communicable with a receiving station 300 via connection 170. The radio frequency antenna 90 receives the radio frequency signal 80.

Remote unit 703 is structured as described above with reference to FIG. 9. The host unit 721 is structured as described above with reference to FIG. 10

The pilot tone receiver 240 is adapted to receive both the amplified the single-frequency tone generated at the remote unit 703 and the single-frequency tone generated at the host pilot tone generator 731. The controller 260 (FIG. 6) is adapted to determine a gain within the host unit 721 and a gain within the reverse path transport link 707. The controller 120 (FIG. 4) is in communication with the remote pilot tone receiver 711 and determines the gain in the remote unit 703. In one implementation of this embodiment, the gain in the remote unit 703 is transmitted to the controller 260 (FIG. 6) in the host unit 721.

In this manner, the gain is monitored within the complete reverse path transport link 707, within the remote unit 703 and within the host unit 721. The controller 120 (FIG. 4) and/or the controller 260 (FIG. 6) are adapted to determine if a gain degradation has occurred in the remote unit 703, the transmission link 160 and/or in the host unit 721. In one implementation of this embodiment, the remote unit 703 includes an alarm that is adapted to generate a warning based on a determination that the gain in the remote unit 703 is not in a preset range of gains. In another implementation of this embodiment, the alarm 275 in the host unit 721 is adapted to generate a warning based on a determination that the gain in the host unit 721 is not in a preset range of gains.

The discussion with reference to FIGS. 1-11 described embodiments of systems and methods to monitor the gain of a broadband radio frequency transport system that includes one or more reverse path transport links in order to determine if the gain in one or more of the reverse path transport links is degraded. The discussion with reference to FIGS. 12-15 relates to systems and methods to monitor the noise-floor level of a broadband transport system in order to determine if the circuitry in one or more of the reverse path transport links is degraded.

Figure 12:
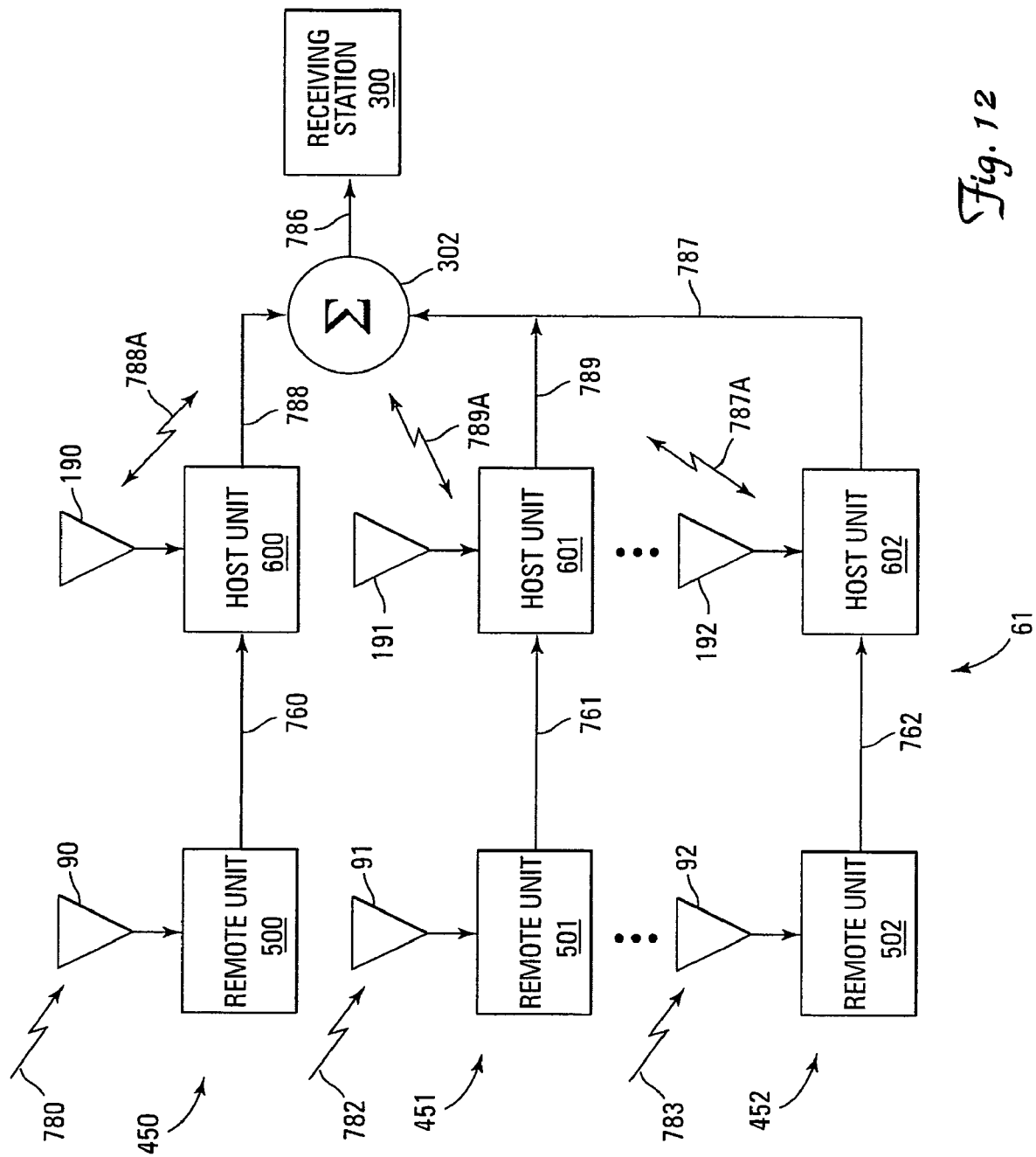
FIG. 12 illustrates a broadband transport system including a plurality of reverse path transport links in communication with a receiving station in accordance with a seventh embodiment of the present invention.

FIG. 12 illustrates a broadband transport system 61 including a plurality of reverse path transport links 450, 451, and 452 in communication with a receiving station 300 in accordance with a seventh embodiment of the present invention. The broadband transport system 61 supports multiple air interfaces to different locations for multiple customers. The reverse path transport links 450, 451, and 452 monitor a broadband transport system 61 and are similar in structure and function to each other. In one implementation of this embodiment, the broadband transport system 61 is a simulcast transmission system.

The reverse path transport link 450 includes a remote unit 500 communicable with a radio frequency antenna 90 and a host unit 600. The host unit 600 receives a signal transmitted from the remote unit 500 over a transmission link 760. The host unit 600 is communicable with a receiving station 300 via summation circuit 302 and connection 786. The radio frequency antenna 90 receives the radio frequency signal 780 and the host unit 600 transmits the amplified signal to a summation circuit 302. The connection between a host unit and the receiving station 300 can be either hard wired, as indicated by connections 787-789, or wireless, as indicated by connection 788A-789A.

In one implementation of this embodiment, the radio frequency antenna 90 is a first radio frequency antenna, and the connection 788A to the summation circuit 302 is wirelessly established via second radio frequency antenna 190. In another implementation of this embodiment, the connection 788A to the receiving station 300 is established via a free-space optical link. In this case, a line-of-sight exists between the host unit 600 and the receiving station 300. In yet another implementation of this embodiment, the connection 788 to the receiving station 300 is established via a physical media. For example, the communication between the host unit 600 and the receiving station 300 is over a hard wire connection such as a coaxial cable, optical fiber, or other broadband media.

The remote unit 500, the transmission link 760 and the host unit 600 operate as a repeater station for the radio frequency signal 780. The information on the signal transmitted via connection 788 or connection 788A is substantially the same as the information on the radio frequency signal 780, but it is amplified after being transmitted through the reverse path transport link 450.

The reverse path transport link 451 includes a remote unit 501 communicable with a radio frequency antenna 91 and a host unit 601. The host unit 601 receives a signal transmitted from the remote unit 501 over a transmission link 761. The host unit 601 is communicable with the receiving station 300 via summation circuit 302 and connection 786. The radio frequency antenna 91 receives the radio frequency signal 782 and the host unit 601 transmits the amplified signal via connection 789 or connection 789A to a summation circuit 302.

In one implementation of this embodiment, the radio frequency antenna 91 is a first radio frequency antenna, and the connection 789A to the summation circuit 302 is wirelessly established via a second radio frequency antenna 191. In another implementation of this embodiment, the connection 788 to the receiving station 300 is established via a physical media. For example, the communication between the host unit 600 and the receiving station 300 is over a hard wire connection such as a coaxial cable, optical fiber, or other broadband media.

The remote unit 600, the transmission link 760 and the host unit 600 operate as a repeater station for the radio frequency signal 782. The information on the signal transmitted via connection 789 or 789A is substantially the same as the information on the radio frequency signal 782, but it is amplified after being transmitted through the reverse path transport link 451.

The reverse path transport link 452 includes a remote unit 502 communicable with a radio frequency antenna 92 and a host unit 602. The host unit 602 receives a signal transmitted from the remote unit 502 over a transmission link 762. The host unit 602 is communicable with the receiving station 300 via summation circuit 302 and connection 786. The radio frequency antenna 92 receives the radio frequency signal 783 and the host unit 602 transmits the amplified signal via connection 787 or 787A to a summation circuit 302.

In one implementation of this embodiment, the radio frequency antenna 92 is a first radio frequency antenna, and the connection 787A to the summation circuit 302 is wirelessly established via a second radio frequency antenna 192. In another implementation of this embodiment, the connection 787 to the receiving station 300 is established via a physical media. For example, the communication between the host unit 602 and the receiving station 300 is over a hard wire connection such as a coaxial cable, optical fiber, or other broadband media.

The remote unit 602, the transmission link 762 and the host unit 602 operate as a repeater station for the radio frequency signal 783. The information on the signal transmitted via connection 787 or connection 787A is substantially the same as the information on the radio frequency signal 783, but it is amplified after being transmitted through the reverse path transport link 452.

The summation circuit 302 receives the amplified signals via connections 787, 788, 789, 787A, 788A, and/or 789A, sums the received signals and transmits the summed signals to the receiving station 300 via connection 786. In one implementation of an embodiment of broadband transport system 61, the summation circuit 302 is internal to the receiving station 300. In another implementation of an embodiment of broadband transport system 61, the summation circuit 302 in external to the receiving station 300. In yet another implementation of an embodiment of broadband transport system 61, the host units 600, 601 and 602 and the summation circuit 302 are internal to the receiving station 300. The radio frequency signals 780-783 are broadband as defined above with reference to FIGS. 3A and 3B. In yet another implementation of an embodiment of broadband transport system 61, the signals transmitted on the transmission links 760, 761 and 762 are digital signals. In such an implementation, the remote units 500-502 include analog-to-digital converters and the host units 600-602 include digital-to-analog converters.

The transmission links 760, 761, and 762 can be one or more of an optical fiber link, a free-space optical link, a millimeter wave link, a coaxial cable link, a twisted-pair cable link, a broadband transmission link, a wireless transmission link, or a physical medium transmission link.

The functionalities of remote units 501 and 502 (FIG. 12) are the same as the functionality of remote unit 500. Likewise, the functionalities of host units 601 and 602 (FIG. 12) are the same as the functionality of host unit 600.

Figure 13:
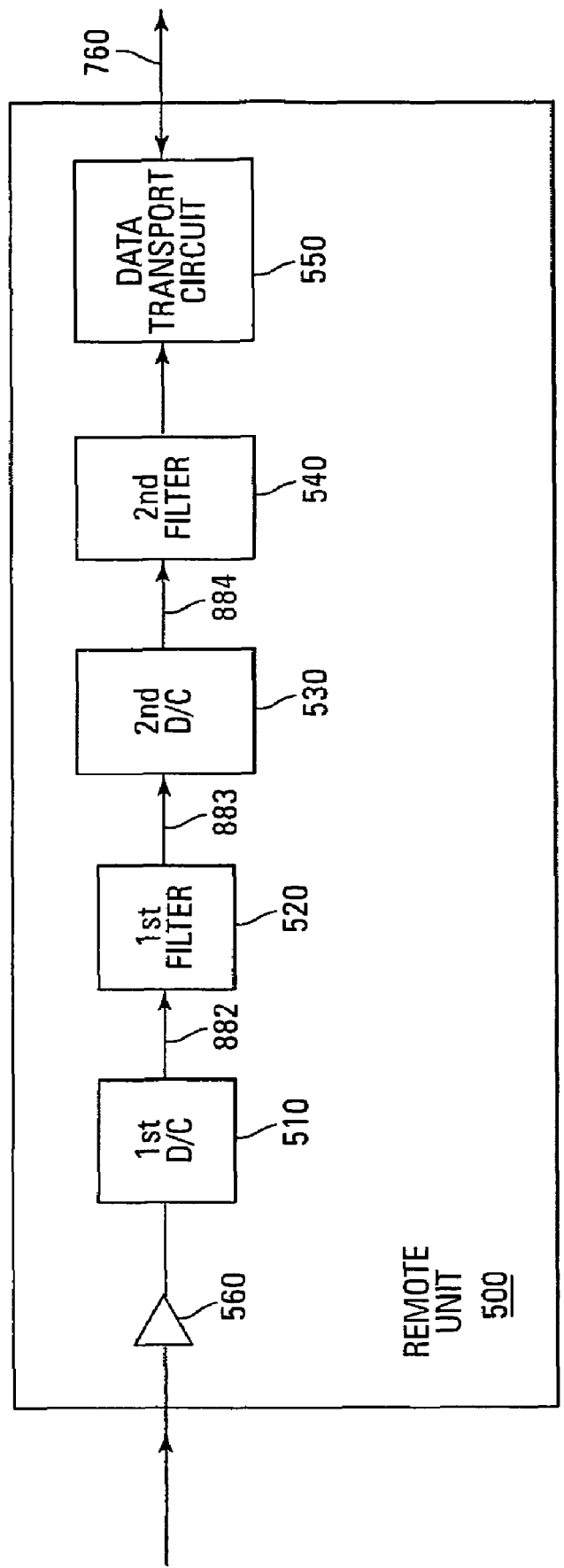
FIG. 13 illustrates a remote unit in accordance with an embodiment of the present invention.

FIG. 13 illustrates an embodiment of a remote unit 500 in accordance with the present invention. The remote unit 500 is adapted to down-convert and to filter the received signal two times after the signal is amplified for transport on transmission link 760. As shown in FIG. 13, the remote unit 500 includes an amplifier 560, a first down-converter 510, a first filter 520, a second down-converter 530, a second filter 540, and a data transport circuit 550. The first down-converter 510, the first filter 520, the second down-converter 530, and the second filter 540 are operable to down-convert and filter the received signal twice so the signal is at a lower frequency than the operating frequency. In an exemplary embodiment, the signal to be transmitted on transmission link 760 is frequency translated to radio frequency signal below 50 MHz and the noise on both sides of the down-converted traffic is removed. The data transport circuit 550 functions to prepare the down-converted signal for transport on transmission link 760. In one implementation of this embodiment, the amplifier 560 is a low noise amplifier.

Figure 14:
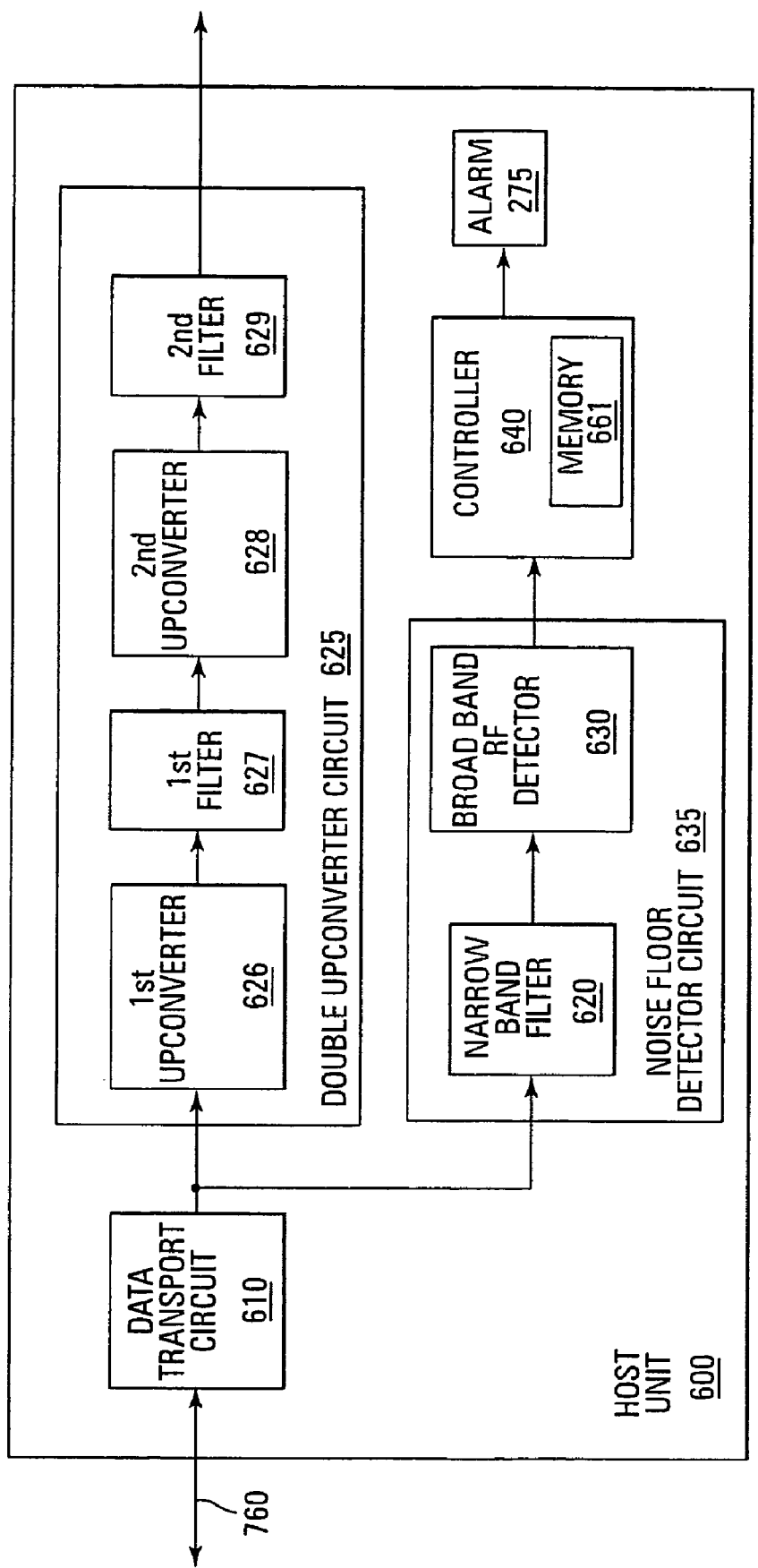
FIG. 14 illustrates a host unit in accordance with an embodiment of the present invention.

The FIG. 14 illustrates an embodiment of a host unit 600 in accordance with an embodiment of the present invention. As shown in FIG. 14, the host unit 600 includes data transport circuit 610, double up-converter circuit 625, noise floor detector circuit 635, controller 640 and alarm 275. The data transport circuit 610 is adapted to receive the signal 760 transmitted from the remote unit 500.

The data transport circuit 610 inputs the received signal to the double up-converter circuit 625 and the noise floor detector circuit 635. The double up-converter circuit 625 includes the first up-converter 626, the first filter 627, the second up-converter 628 and the second filter 629. The double up-converter circuit 625 up-converts the in-band radio frequency traffic and the transport noise. The filters strip the up-converted transport noise from the up-converted in-band frequency traffic. In this manner, the double up-converter circuit 625 outputs the up-converted in-band radio frequency traffic after the up-converted out of band transport noise has been removed.

In another implementation of this embodiment, the remote unit 500 is adapted to directly down-convert the signal after the signal is amplified for transport on transmission link 760 and the host unit 600 is adapted to direct up-convert the signal transported on the transmission link 760. In this case, the remote unit 500 includes an amplifier 560, a first down-converter 510, a first filter 520, and a data transport circuit 550 without the second down-converter 530 and the second filter 540. The date transport circuit 550 is adapted to transmit the directly down-converted signal over the transmission link 760. In this embodiment, the host unit 600 includes data transport circuit 610, noise floor detector circuit 635, controller 640 and alarm 275 without the double up-converter circuit 625. In this embodiment the data transport circuit 610 is adapted to receive the direct down-converted signal transmitted over the transmission link 760 and to direct up-convert the received signal and to send the up-converted signal to the summing circuit 302 (FIG. 12). Other system configurations for directly down-converting the signal are possible.

The noise floor detector circuit 635 includes one or more narrow band filter 620 and a broadband radio frequency detector 630. The noise floor detector circuit 635 receives the transported in-band radio frequency traffic and the transport noise including noise at frequencies outside of the in-band frequencies. The one or more narrow band filters 620 are located in the frequency spectral range above and/or below the twice down-shifted in-band frequency spectral range. The narrow band filters 620 transmit the noise at narrow bands of frequencies outside of the in-band frequencies to the broadband radio frequency detector 630. The broadband radio frequency detector 630 measures the power level of the noise transmitted from the narrow band filters 620. The broadband radio frequency detector 630 outputs the power level of the measure noise to the controller 640. As shown in FIG. 14, the controller 640 includes a memory 661. In another implementation, the controller 640 comprises a microprocessor or microcontroller. The controller 640 is in communication with an alarm 275. If the reverse path transport link 450 is functioning normally, the signal 760 received at the host unit 600 is as noise free as the signal transmitted from the remote unit 500 via transmission link 760.

In another implementation the remote unit 500 includes an analog-to-digital converter and the host unit 600 includes a digital-to-analog converter.

Figure 15:
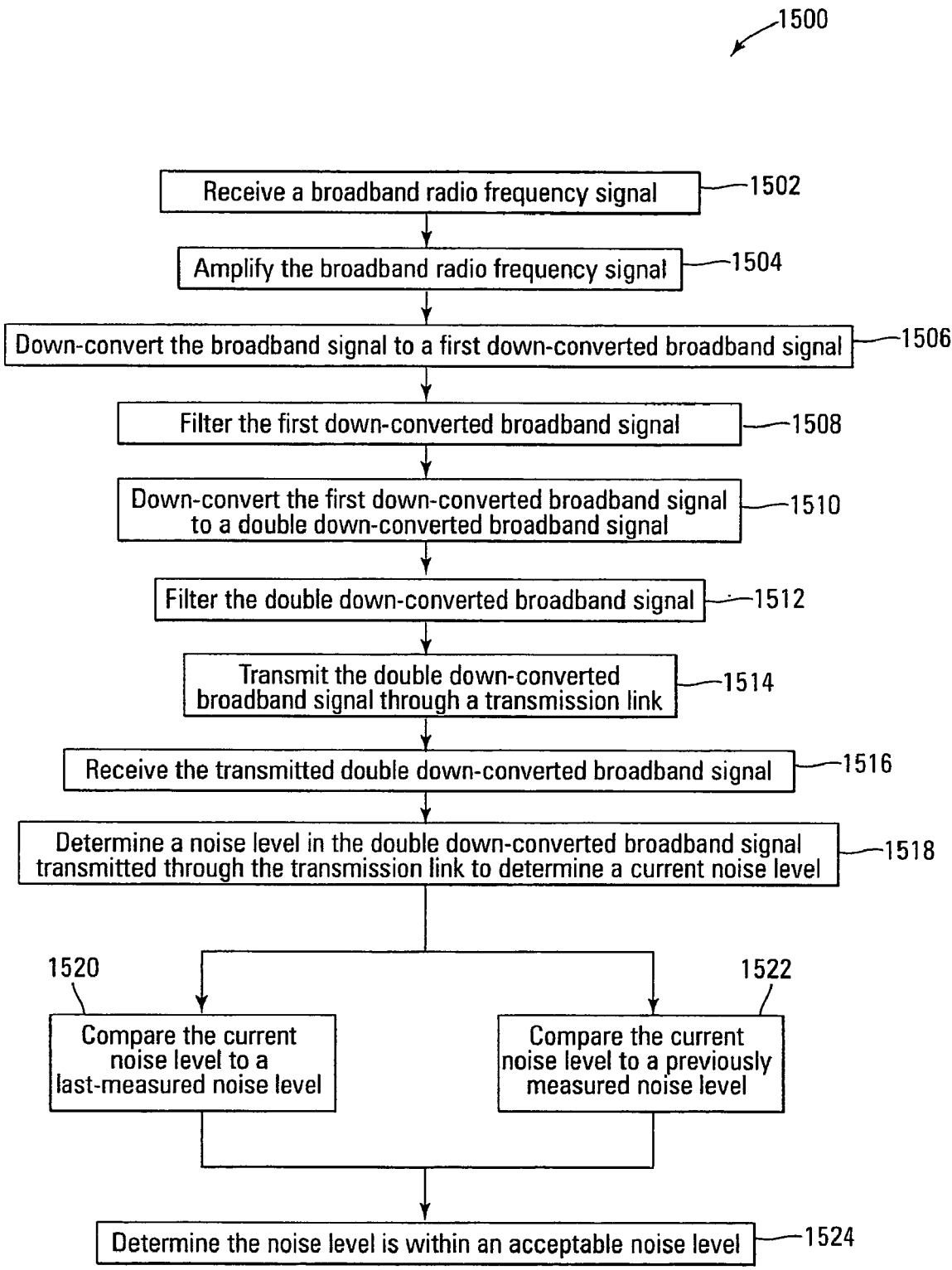
FIG. 15 is a flow diagram illustrating a method to monitor noise level in a broadband transport system in accordance with an embodiment of the present invention.

FIG. 15 is a flow diagram 1500 illustrating a method to monitor noise level in a broadband transport system 61 in accordance with an embodiment of the present invention. A monitoring of the noise level in the broadband transport system 61 occurs each time flow diagram 1500 is implemented. Flow diagram 1500 is described with reference to the reverse path transport link 450 (FIG. 12) that includes remote unit 500 as shown in FIG. 13 and the host unit 600 as shown in FIG. 14. Flow diagram 1500 is also described with reference to exemplary broadband spectra shown in FIGS. 3A and 3B. The controller 120 executes software and/or firmware that causes the controller 120 to perform at least some of the processing described here as being performed by the remote unit 100. At least a portion of such software and/or firmware executed by the controller 120 and any related data structures are stored in memory 121 during execution.

The software and/or firmware executed by the controller 640 comprises a plurality of program instructions that are stored or otherwise embodied on a storage medium, such as memory 661, from which at least a portion of such program instructions are read for execution by the controller 640. Memory 661 comprises any suitable memory now known or later developed such as, for example, random access memory (RAM), read only memory (ROM), and/or registers within the controller 120. In one implementation, the controller 640 comprises a microprocessor or microcontroller. Moreover, although the memory 661 is shown internal to the controller 640 in FIG. 14, the memory 661 and controller 640 are separate devices in one implementation. Other elements in the remote unit 500 and the host unit 600 include the software and/or firmware as required for the operations described with reference to flow diagram 1500.

At block 1502, the remote unit 500 receives the broadband radio frequency signal 781 from the antenna 90. In one implementation of the broadband transport system 61, the radio frequency signal 780 is within the defined frequency spectrum 301 or 500 of FIGS. 3A or 3B, respectively. At block 1504, the amplifier 560 amplifies the received broadband radio frequency signal.

Blocks 1506-1512 describe the process of double down-converting the broadband signal. At block 1506, the first down-converter 510 down-converts the broadband signal to a first down-converted broadband signal and inputs the first down-converted broadband signal to first filter 520. Down-conversion of signals is known in the art is not discussed herein. At block 1508, the first filter 520 filters the first down-converted broadband signal to reduce the noise on the first down-converted broadband signal. Any frequencies outside of the in-band radio frequency traffic are removed by the first filter 520.

At block 1510, the second down-converter 530 down-converts the first down-converted broadband signal to a second down-converted broadband signal and inputs the second down-converted broadband signal to second filter 540. At block 1512, the second filter 540 filters the first second down-converted broadband signal to reduce the noise on the second down-converted broadband signal. Any frequencies outside of the in-band radio frequency traffic are removed by the second filter 540. The second filter 540 outputs the filtered second down-converted broadband signal to the data transport circuit 550. At block 1514, the data transport circuit 550 transmits the double down-converted broadband signal to the host unit 600 via transmission link 760 (FIG. 12).

At block 1516, the host unit 600 receives the transmitted double down-converted broadband signal. The double down-converted broadband signal is received at the data transport circuit 610. The data transport circuit 610 inputs the received double down-converted broadband signal to the double up-converter circuit 625 and the noise floor detector circuit 635.

The double up-converter circuit 625 is adapted to up-convert in frequency the in-band radio frequency signals by inputting the received double down-converted broadband signal through the first up-converter 626, the first filter 627, the second up-converter 628 and the second filter 629. After the double down-converted broadband signal is transmitted through the double up-converter circuit 625, the signal is transmitted to the summation circuit 302 and on to the receiving station 300 (FIG. 12).

The noise floor detector circuit 635 is adapted to determine the power level of the noise in the received double down-converted broadband signal outside the frequency of the in-band radio frequency signals. Specifically, the noise floor detector circuit 635 detects a noise-level of the received signal at a narrow band frequency range outside the frequency range of the double-down converted broadband signal.

The narrow band filter 620 transmits a narrow band of frequencies that are positioned above and/or below the frequency range of the double-down converted broadband signal. The narrow band filter 620 outputs the transmitted narrow band of frequencies to the broadband radio frequency detector 630. The broadband radio frequency detector 630 detects the noise level at the narrow band of frequencies and outputs the noise level to the controller 640. The spectral density of the noise level at the narrow band of frequencies is about the same as the noise level in the frequency range of the double-down converted broadband signal.

At block 1518, the controller 640 determines the noise level in the double-down converted broadband signal transmitted through the transmission link 760 to determine a current noise level. The controller is periodically determining the noise level in the double-down converted broadband signal transmitted through the transmission link 760 to determine a current noise level and saving the noise level in the memory 661. The noise level stored in the memory 661 just prior to the current noise level value is defined herein as a last-measured noise level. All the noise levels stored in the memory 661 prior to the last-measured noise level are defined herein as previously measured noise levels.

At blocks 1520-1522, the controller 640 uses one or more optional methods to determine the noise level in the double-down converted broadband signal after it was transmitted from the remote unit 500 to the host unit 600 via the reverse path transport link 450. The one or both of the methods described with reference to blocks 1520-1522 are implemented by the controller 640 in the host unit 600 to compare noise levels.

At block 1520, the controller 640 compares the current noise level to the last-measured noise level. The controller 640 retrieves the last-measured noise level from the memory 661.

At block 1522, the controller 640 compares the current noise level to the previously-measured noise level. In this implementation of the embodiment of block 1522, the controller 640 stores the measured noise levels in the memory 661. The controller 640 retrieves one of the previously-measured noise levels from the memory 661. The controller 640 determines which of the previously-measured noise levels is required to compare to the current noise level. In one implementation of the embodiment of block 1522, the controller 640 stores the measured noise levels in the memory 661 with a date and/or time indicator and retrieves a previously-measured noise level from the memory 661 based on the preset time period that is stored in memory. The preset time period is the time between the current time and the time of the previously measured noise level.

In one implementation of this embodiment, the preset time period is a relatively long time compared to the time elapsed between comparing the current noise level to the last-measured noise level. In such an implementation, the previously-measured noise level functions as a calibration level. In an exemplary embodiment, the preset time period is one year and the monitoring of the broadband transport system 61 provides a calibration check of the broadband transport system 61 to ensure that a slow, long term degradation is monitored.

In one implementation of flow diagram 1500, the flow proceeds through block 1520 more frequently than the flow proceed through block 1522. In an exemplary embodiment, the flow proceeds through block 1520 every 20 minutes and the flow proceed through block 1522 every year. The controller 640 controls the monitoring schedule.

At block 1524, the controller 640 determines if a noise level is within an acceptable noise level based on the comparisons of block 1520 and/or block 1522. The controller 640 retrieves the acceptable noise level from the memory 661. In one implementation of this embodiment, the controller 640 determines the noise level is not within an acceptable noise level if the noise level has changed drastically over a preset time.

In one implementation of this embodiment, the controller 260 is adapted to trigger the alarm 275 to generate a warning based on a determination that the power level of the noise outside the frequency of the in-band signals changes by more than a specified threshold within a preset time. In another implementation of this embodiment, the selected threshold is 6 dB. In this case if the noise floor increases by 6 dB for a resulting 6 dB drop in the signal to noise ratio, the alarm 275 generates a warning. In another exemplary embodiment, the broadband transport system 61 monitors for an increase in the noise level of more than 6 dB in one hour.

Thus, as described above for all the embodiments broadband transport system 61 including embodiments of a plurality of reverse path transport links 450, 451 and 452, embodiments of flow diagram 1500 are useful to monitor noise levels in repeater links in the broadband transport system 61.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system to monitor gain in a broadband radio frequency transport system, the system comprising:
   at least one radio frequency antenna that receives a radio frequency signal;
   at least one remote unit, each remote unit communicable with a respective one of the radio frequency antennae, each remote unit comprising,
      a pilot tone generator adapted to generate at least one single-frequency tone having a known power level,
      a summing circuit operably associated with the pilot tone generator adapted to sum the at least one single-frequency tone with the respective received radio frequency signal,
      at least one amplifier in communication with the summing circuit, wherein the at least one amplifier amplifies the summed signal, sends the signal to a remote pilot tone receiver, and transmits the signal over a respective transmission link;
      the remote pilot tone receiver adapted to detect the at least one single-frequency tone in the signal;
      a controller communicatively coupled with the remote pilot tone receiver to determine a gain within the remote unit based on the detected single-frequency tone; and
   at least one host unit adapted to receive the signal transmitted over the transmission link from a respective one of the remote units, each host unit comprising:
      a host pilot tone generator adapted to generate at least one single-frequency tone having a known power level, wherein the at least one single-frequency tone generated at the host pilot tone generator is distinguished, by frequency or timing, from the at least one single-frequency tone generated at the pilot tone generator in the remote unit;
      a signal summing circuit operably associated with the host pilot tone generator adapted to add the at least one single-frequency tone from the host pilot tone generator to the received signal;
      a pilot tone receiver circuit adapted to receive the transmitted signal and the at least one single-frequency tone from the host pilot tone generator, adapted to detect the at least one single-frequency tone transmitted over the transmission link from the received signal, and adapted to detect the at least one single-frequency tone from the host pilot tone generator; and
      a controller adapted to determine a gain within the transmission links, adapted to determine a gain within the host unit based on the detection of the single-frequency tone from the host pilot tone generator, and adapted to determine if the gains are each in a preset range of gains based on the power level of the received pilot tones.

2. The system of claim 1, the system further comprising:
   the transmission link between the remote unit and the host unit; and
   a connection to a receiving station.

3. The system of claim 2, wherein the transmission link is selected from a group that comprises an optical fiber link, a free-space optical link, a millimeter wave link, a coaxial cable link, a twisted-pair cable link, a broadband transmission link, a wireless transmission link, a physical medium transmission link, and combinations thereof.

4. The system of claim 2, wherein the radio frequency antenna is a first radio frequency antenna, and wherein the connection to the receiving station is established via at least one second radio frequency antenna.

5. The system of claim 2, wherein the connection to the receiving station is established via a physical media.

6. The system of claim 2, wherein the connection to the receiving station is established via a free-space optical link.

7. The system of claim 2, wherein the system is a simulcast transmission system.

8. The system of claim 1, wherein the host unit further comprises:
a radio frequency up-converter to up-convert the received signal; and
an alarm adapted to generate a warning based on a determination that the gain is not in a preset range of gains.

9. The system of claim 8, wherein the warning is transmitted to a receiver station.

10. The system of claim 1, wherein the received radio frequency signal is within a defined frequency spectrum, and wherein the at least one single-frequency tone is at a frequency above the defined frequency spectrum.

11. The system of claim 1, wherein the received radio frequency signal is within a defined frequency spectrum, and wherein the at least one single-frequency tone is at a frequency below the defined frequency spectrum.

12. The system of claim 1, wherein the received radio frequency signal is within a defined frequency spectrum, and wherein the at least one single-frequency tone includes a first frequency below the defined frequency spectrum and a second frequency above the defined frequency spectrum.

13. The system of claim 1, wherein the at least one single-frequency tone is positioned at a frequency to minimize interference with received radio frequency signals including frequencies above and below the frequency of the single-frequency tone.

14. The system of claim 1, wherein the signal transmitted over the transmission link is a digitized signal, and wherein the host unit further comprises:
a digital to analog converter circuit.

15. The system of claim 1, wherein the pilot tone generator periodically generates the at least one single-frequency tone.

16. The system of claim 15, wherein the controller is adapted to determine a difference in gain between the periodically generated single-frequency tones.

17. The system of claim 16, wherein the controller is adapted to trigger an alarm to generate a warning based on a determination that the difference in gain between the periodically generated single-frequency tones is greater than a selected threshold.

18. The system of claim 17, wherein the selected threshold is −6 dB.

19. A method to monitor gain in a broadband transport system, the method comprising:
receiving a broadband radio frequency signal;
adding at least one single-frequency tone to the broadband signal to form a summed signal at a remote unit;
detecting the at least one single-frequency tone to determine a gain within the remote unit;
transmitting the summed signal through a transmission link;
receiving the transmitted summed signal at a host unit;
adding at least one single-frequency tone to the received transmitted summed signal at the host unit, wherein the at least one single-frequency tone added to the broadband signal at the remote unit is distinguished, by frequency or timing, from the at least one single-frequency tone added at the host unit;
determining a gain in the at least one single-frequency tone transmitted through the transmission link;
determining a gain in the at least one single-frequency tone added at the host unit; and
determining when the gains are acceptable gains.

20. The method of claim 19, wherein receiving the transmitted summed signal comprises:
up-converting the received signal; and
receiving the up-converted signal at a pilot tone receiver.

21. The method of claim 19, wherein adding at least one single-frequency tone to the broadband signal at the remote unit comprises:
generating the at least one single-frequency tone at a pilot tone generator in the remote unit, and wherein adding at least one single-frequency tone to the received transmitted summed signal at the host unit comprises:
generating the at least one single-frequency tone having a known power at a host pilot tone generator.

22. The method of claim 21, wherein at least one of the generatings is a periodic generating.

23. The method of claim 22, wherein at least one of determining a gain in the at least one single-frequency tone transmitted through the transmission link and determining a gain in the at least one single-frequency tone added at the host unit comprises:
determining a ratio of a power level of a current single-frequency tone to a power level of a last-measured single-frequency tone.

24. The method of claim 22, wherein at least one of determining a gain in the at least one single-frequency tone transmitted through the transmission link and determining a gain in the at least one single-frequency tone added at the host unit comprises:
determining a ratio of the power level of the current single-frequency tone to a power level of a previously measured single-frequency tone.

25. The method of claim 22, wherein at least one of determining a gain in the at least one single-frequency tone transmitted through the transmission link and determining a gain in the at least one single-frequency tone added at the host unit comprises:
determining a ratio of the power level of the current single-frequency tone to a power level of a previously measured single-frequency tone.

26. The method of claim 22, further comprising:
calibrating a power level of the at least one single-frequency tone added to the broadband signal at the remote unit, wherein the determining a gain in the at least one single-frequency tone comprises,
determining a ratio of the power level of a current single-frequency tone to the power level of the calibrated single-frequency tone.

27. The method of claim 22, the method further comprising:
sequentially generating a plurality of single-frequency tones in a preset time; and
comparing a peak-hold power level for the sequentially generated plurality of single-frequency tones to a power level of a calibrated single-frequency tone.

28. The method of claim 22, the method further comprising:
sequentially generating a plurality of single-frequency tones in a preset time; and
comparing an average power level for the sequentially generated plurality of single-frequency tones to a power level of a calibrated single-frequency tone.

* * * * *

UNITED STATES PATENT AND TRADEMARK OFFICE
CERTIFICATE OF CORRECTION

PATENT NO. : 7,603,093 B2
APPLICATION NO. : 11/302723
DATED : October 13, 2009
INVENTOR(S) : Kremer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 787 days.

Signed and Sealed this

Fifth Day of October, 2010

David J. Kappos
*Director of the United States Patent and Trademark Office*